United States Patent
Kikuchi

(10) Patent No.: US 6,570,879 B1
(45) Date of Patent: May 27, 2003

(54) COMMUNICATIONS SYSTEM AND METHOD OF CONTROLLING SAME

(75) Inventor: Toru Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/250,082

(22) Filed: Feb. 16, 1999

(30) Foreign Application Priority Data

Feb. 18, 1998 (JP) .......................................... 10-035927

(51) Int. Cl.[7] .............................................. H04L 12/28
(52) U.S. Cl. .......................... 370/395.21; 370/395.32; 370/401
(58) Field of Search ................................ 370/252, 351, 370/352, 353, 354, 355, 356, 357, 395.21, 395.32, 401

(56) References Cited

U.S. PATENT DOCUMENTS

| | | | | |
|---|---|---|---|---|
| 5,604,737 A | * | 2/1997 | Iwami et al. ............... | 370/352 |
| 5,732,078 A | * | 3/1998 | Arango ....................... | 370/352 |
| 5,742,596 A | * | 4/1998 | Baratz et al. ............... | 370/356 |
| 5,898,673 A | * | 4/1999 | Riggan et al. ............... | 370/237 |
| 5,970,126 A | * | 10/1999 | Bowater et al. ............ | 370/352 |
| 6,064,653 A | * | 5/2000 | Farris ........................ | 370/352 |
| 6,137,792 A | * | 10/2000 | Jonas et al. ................. | 370/354 |

* cited by examiner

Primary Examiner—Seema S. Rao
Assistant Examiner—Frank Duong
(74) Attorney, Agent, or Firm—Morgan & Finnegan

(57) ABSTRACT

In order to make it possible for communications quality required for communication to be selected optimally in conformity with the states of a plurality of networks, which network is to be used for communication is selected based upon a plurality of communications qualities and communication is performed upon reserving the communications resources of the selected network.

17 Claims, 27 Drawing Sheets

FIG. 6

| | CALL DESTINATION ID AREA 1 | ... | CALL DESTINATION ID AREA L |
|---|---|---|---|
| PSTN-LAN TELEPHONE CONNECTION DEVICE 113-1 | UNIT CHARGE 11 | ... | UNIT CHARGE L1 |
| PSTN-LAN TELEPHONE CONNECTION DEVICE 113-2 | UNIT CHARGE 12 | ... | UNIT CHARGE L2 |
| ... | ... | ... | ... |
| PSTN-LAN TELEPHONE CONNECTION DEVICE 113-i | UNIT CHARGE 1i | ... | UNIT CHARGE Li |
| ... | ... | ... | ... |
| PSTN-LAN TELEPHONE CONNECTION DEVICE 113-N | UNIT CHARGE 1N | ... | UNIT CHARGE LN |

600

F I G. 8
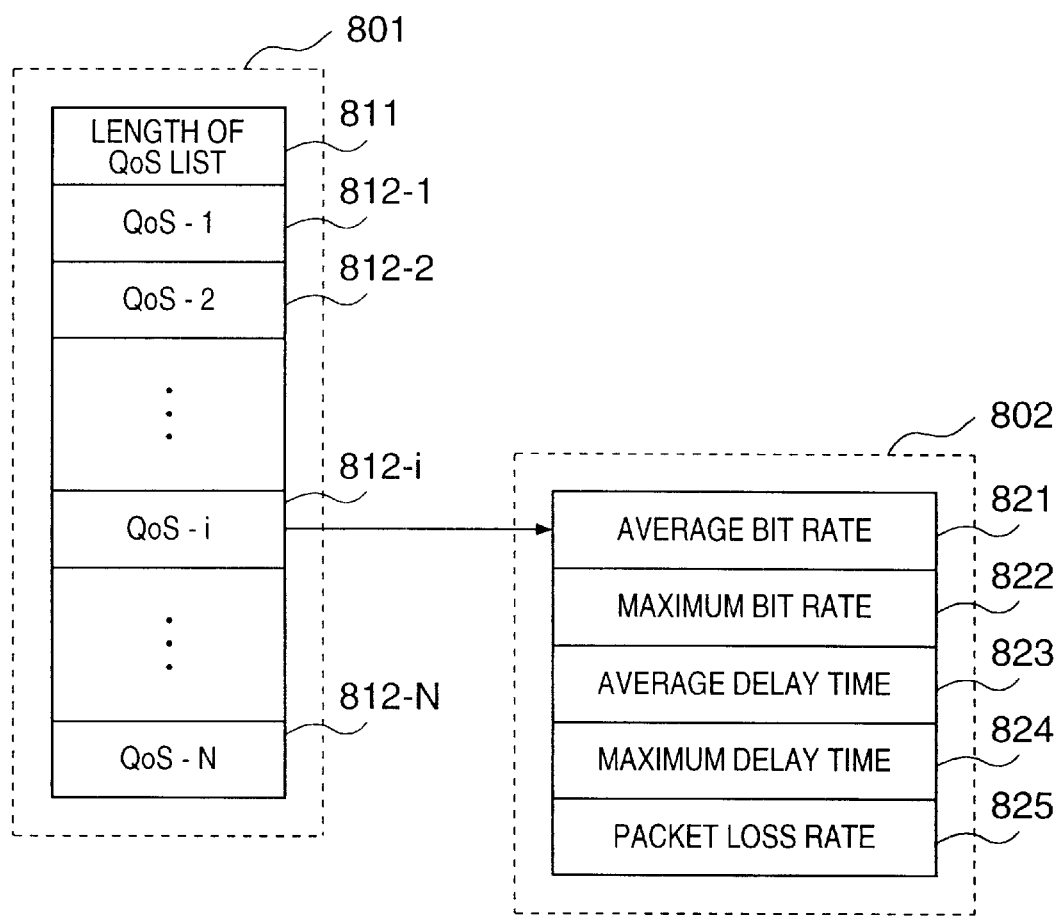

COMMUNICATIONS SYSTEM AND METHOD OF CONTROLLING SAME

BACKGROUND OF THE INVENTION

1. Field of the Invention

This invention relates to a communications system and to a method of controlling the same.

2. Description of the Related Art

A system connected to a communications network to perform communication is so adapted that the user selects the communications network in advance to carry out communication. The selection is made in conformity with the transmission quality requirement necessitated by the type of data handled by the system. Examples of networks that can be selected are a PSTN (Public Switched Telephone Network), ISDN (Integrated Services Digital Network), PSPDN (Packet Switching Public Data Network) and the Internet.

By way of example, a system requiring little delay as in the case of a videoconference system is connected to a PSTN or ISDN, whereas a system that allows some delay, such as a system for data transfer and e-mail, is connected to a PSPDN or the Internet.

However, in a case where a system that employs a coding/compression scheme conforming to the connected communications network to perform voice/image communication by a protocol related to the TCP/IP (Transmission Control Protocol/Internet Protocol) is configured for a network such as a PSTN, ISDN or Internet, the prior art described above is such that the network to which the connection is to be established must be decided beforehand and the related settings must be made. For example, there are cases where it is desired to perform long-distance communication via the Internet and short-distance communication via an ISDN. In such cases, communication terminal settings must be changed by manual input whenever communication is performed. There are also cases where it is desired to transmit by a PSTN line, even for short-distance communication, because an ISDN line is busy. And there are instances where it is desired to communicate directly via an ISDN line because of heavy traffic congestion on the Internet and an inability to obtain satisfactory quality for communication owing to the time delay. In all of these cases the operator must change the connections and data settings each time. This is a very troublesome task.

More generally, with a system of the type that is connected to a network, typified by an ATM network, in which it is usually possible to reserve the resources that satisfy the required communications quality, what can and cannot be communicated upon relaxing the quality requirement must be selected if resources that will make it possible to obtain the sought communications quality cannot be reserved. Even achieving the downgrading of the communications quality requirement demands that the operator change the requirement manually. There are many quality-related items, such as delay, loss and bandwidth, and the operator must decide which item is to undergo the reduction in quality and in what way. However, the prior art is such that such instances cannot be dealt with in a flexible manner.

SUMMARY OF THE INVENTION

An object of the present invention is to provide a communications system in which the communications quality of a system can be changed in appropriate fashion in dependence upon the status of a network.

Another object of the present invention is to make it possible to change a communications quality requirement automatically.

Another object of the present invention is to select an optimum route based upon a changed communications quality requirement.

A further object of the present invention is to assign priorities to communications qualities.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a cost calculation table according to a second embodiment of the present invention;

FIG. 8 is a diagram showing the structure of communications quality data according to the first embodiment;

DESCRIPTION OF THE PREFERRED EMBODIMENTS

First Embodiment

Figure 1:
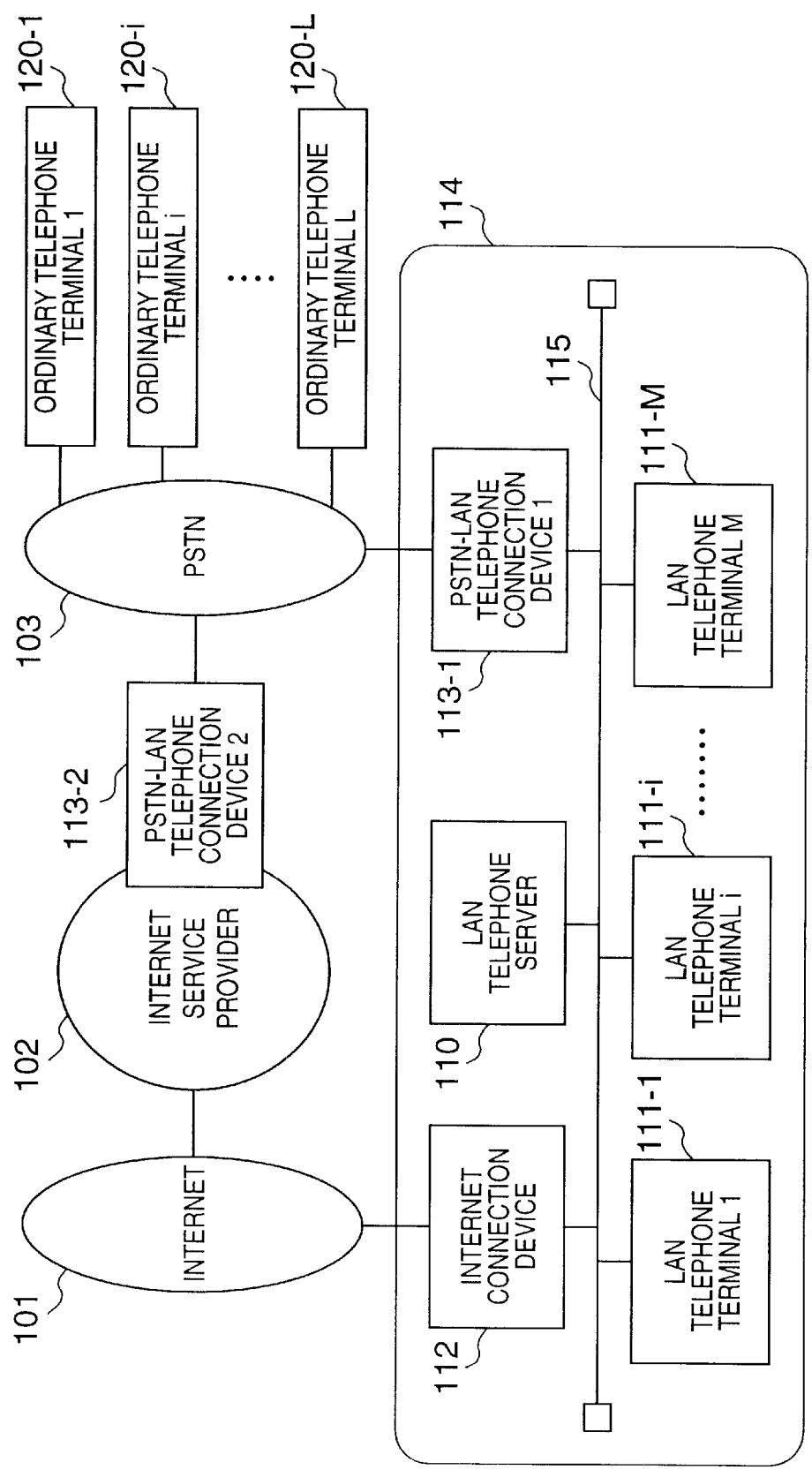
FIG. 1 is a block diagram showing a communications system in accordance with a first embodiment of the present invention.

FIG. 1 is a block diagram of a communications according to a first embodiment of the present invention, namely a telephone system that makes telephone conversion possible by making a connection for voice communication in accordance with TCP/IP over a LAN or the Internet, etc., and for telephone communication over a public network such as a PSTN. Shown in FIG. 1 are the Internet, indicated at 101; an Internet service provider 102, which provides an Internet connection service; and a PSTN-LAN telephone connection device 113-2, which is connected to a PSTN 103 and to a LAN within the Internet service provider 102 and has a function for controlling connection to the PSTN 103 and a function for effecting a conversion between telephone speech on the PSTN 103 and voice data of TCP/IP. The PSTN 103 is an ordinary analog telephone network. A telephone system (referred to as a "LAN telephone system" below) 114 is configured in such a manner that voice telephone conversion is carried out in accordance with a protocol such as TCP/IP by a device that has been connected to a LAN 115 in compliance with IEEE 802.3, etc. Shown at 120-i is an ordinary telephone terminal, which is a telephone terminal that is generally connected to the PSTN 103. The LAN telephone system 114 includes an Internet connection device 112 connecting the LAN 115 and the Internet 101 via a leased line and having a routing function, a security function and a proxy function; a PSTN-LAN telephone connection device 113-1 having functions similar to those of the PSTN-LAN telephone connection device 113-2; a LAN telephone terminal 111-i, which is connected to the LAN 115 and has voice input/output units such as a microphone, speaker and handset and a user interface, for performing LAN telephone connection control in response to instructions from the user as well as processing for transferring voice data during a telephone conversion; and a LAN telephone server 110 for managing the LAN telephone terminal 111-i.

Figure 2:
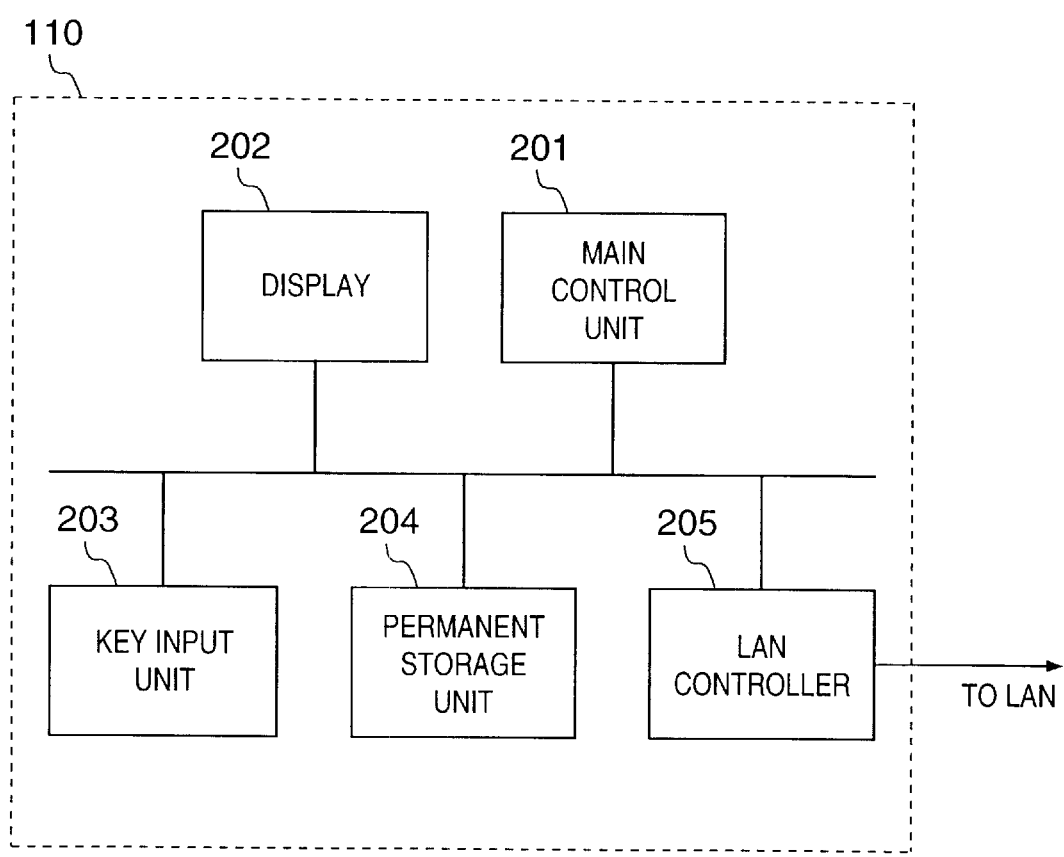
FIG. 2 is a block diagram showing a LAN telephone server according to the embodiment.

FIG. 2 is a block diagram showing the LAN telephone server 110. The latter includes a LAN controller 205 in compliance with IEEE 802.3 or the like; a permanent storage unit 204 such as a hard disk; a display unit 202 such as a CRT display; a key input unit 203 such as a keyboard and mouse; and a main control unit 201 composed of a CPU, ROM and RAM, etc., for administering various control operations.

The CPU of the main control unit 201 performs various control operations in accordance with programs stored in the ROM.

Figure 3:
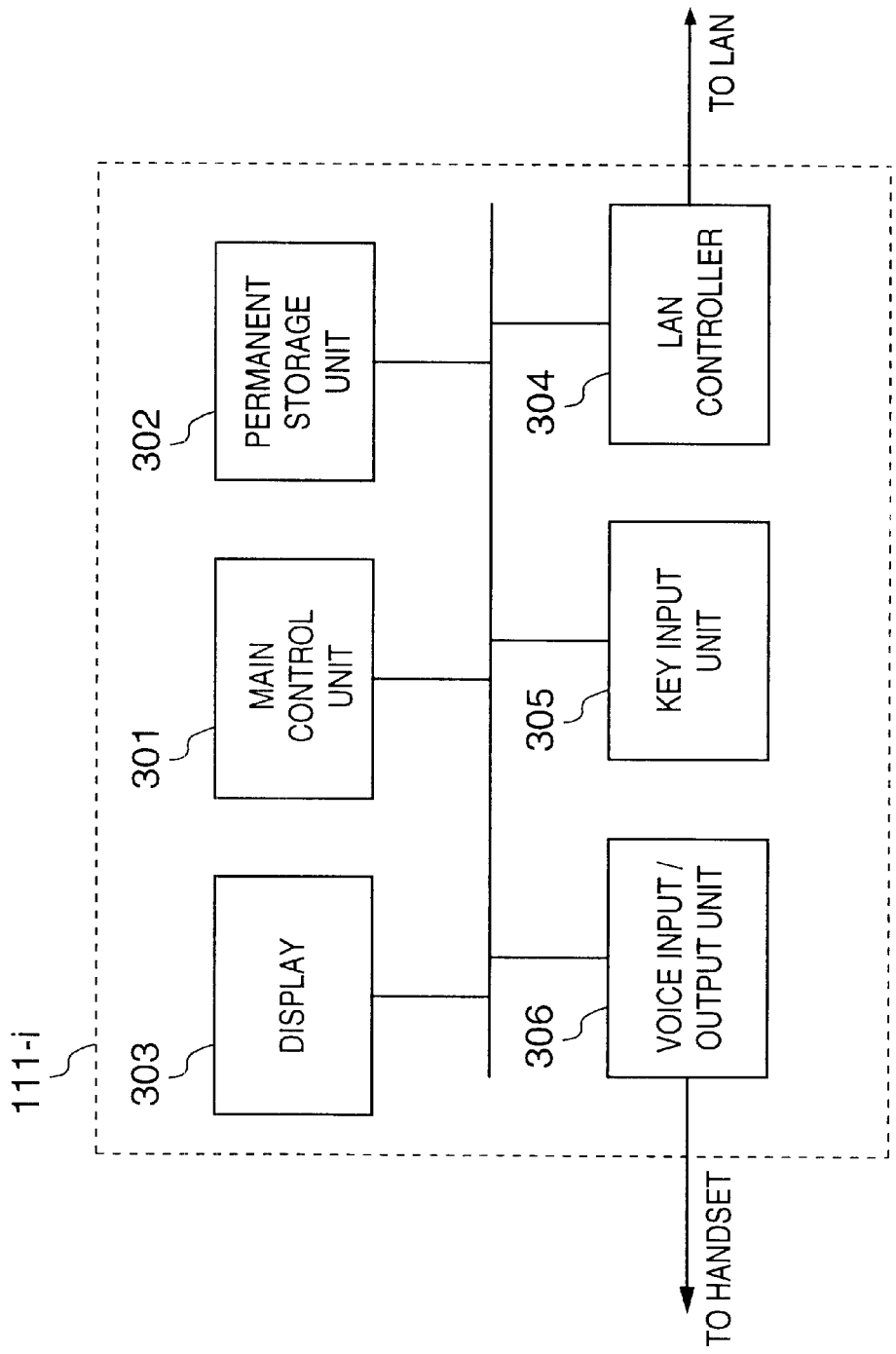
FIG. 3 is a block diagram showing a LAN telephone terminal according to the embodiment.

FIG. 3 is a block diagram of the LAN telephone terminal 111-i. The latter includes a main control unit 301 composed of a CPU, ROM and RAM, etc., for administering various control operations, wherein the CPU performs various control operations in accordance with programs stored in the ROM; a permanent storage unit 302 such as a hard disk; a display unit 303 such as a CRT display; a LAN controller 304 in compliance with IEEE 802.3 or the like; a key input unit 305 such as a keyboard and mouse; and a voice input/output unit 306, to which a microphone and speaker of a handset or the like are connected, for converting analog information to digital information by a codec or the like and inputting/outputting voice data.

Figure 4:
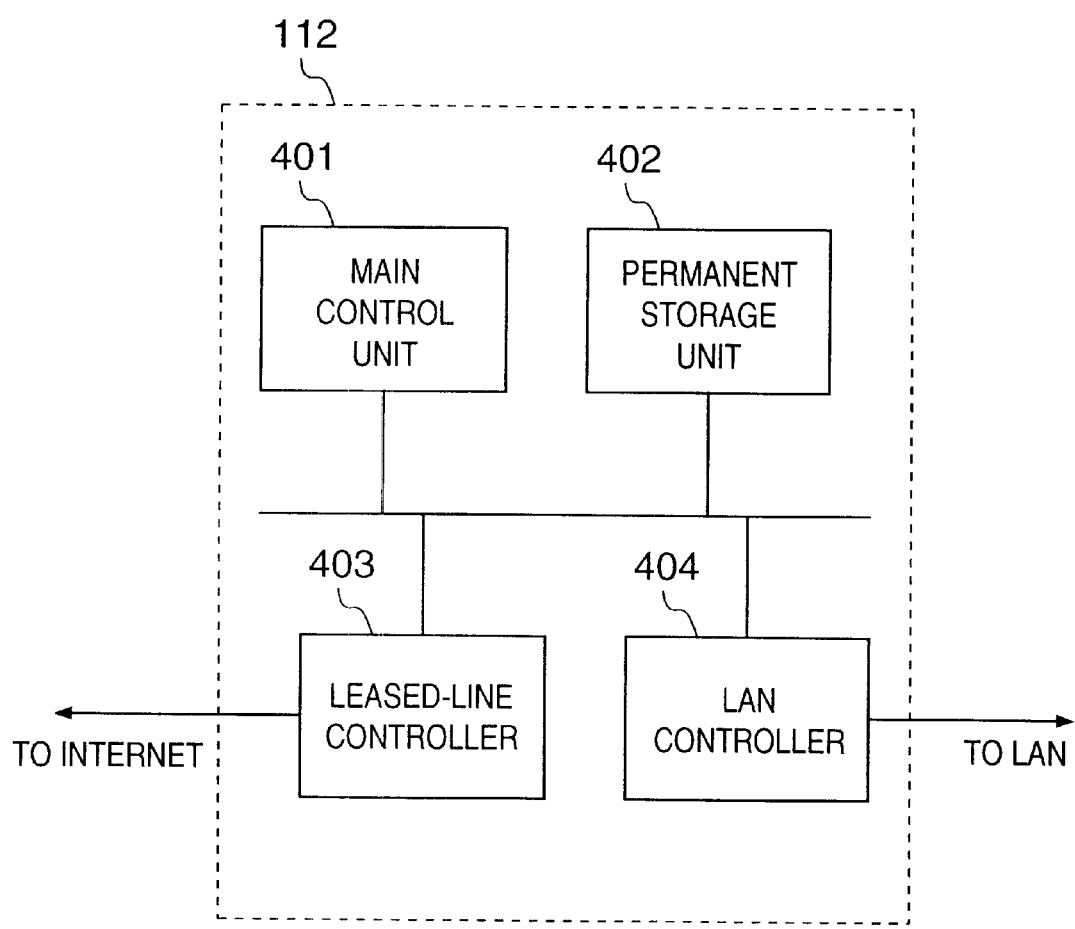
FIG. 4 is a block diagram showing an Internet connection device according to the embodiment.

FIG. 4 is a block diagram of the Internet connection device 112. The latter includes a main control unit 401 composed of a CPU, ROM and RAM, etc., wherein the CPU performs various control operations in accordance with programs stored in the ROM; a permanent storage unit 402 such as a hard disk; a LAN controller 404 in compliance with IEEE 802.3 or the like; and a leased-line controller 403 having a leased-line connection interface and a data transmission interface.

Figure 5:
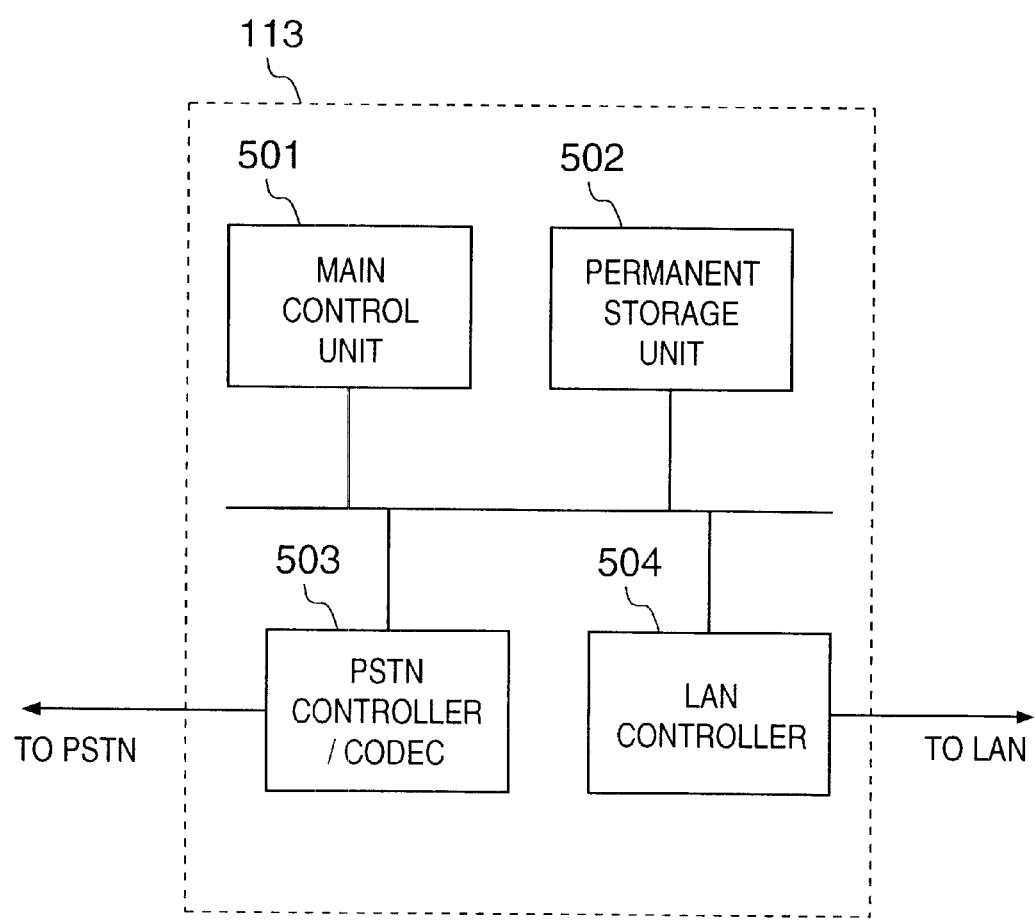
FIG. 5 is a block diagram showing a PSTN-LAN telephone connection device according to the embodiment.

FIG. 5 is a block diagram of the PSTN-LAN telephone connection device 113. The latter includes a main control unit 501 composed of a CPU, ROM and RAM, etc., wherein the CPU performs various control operations in accordance with programs stored in the ROM; a permanent storage unit 502 such as a hard disk; a LAN controller 504 in compliance with IEEE 802.3; and a PSTN controller 503, which performs connection control with respect to the PSTN 103 and has a codec so that analog information from the PSTN can be converted to digital information.

Figure 7:
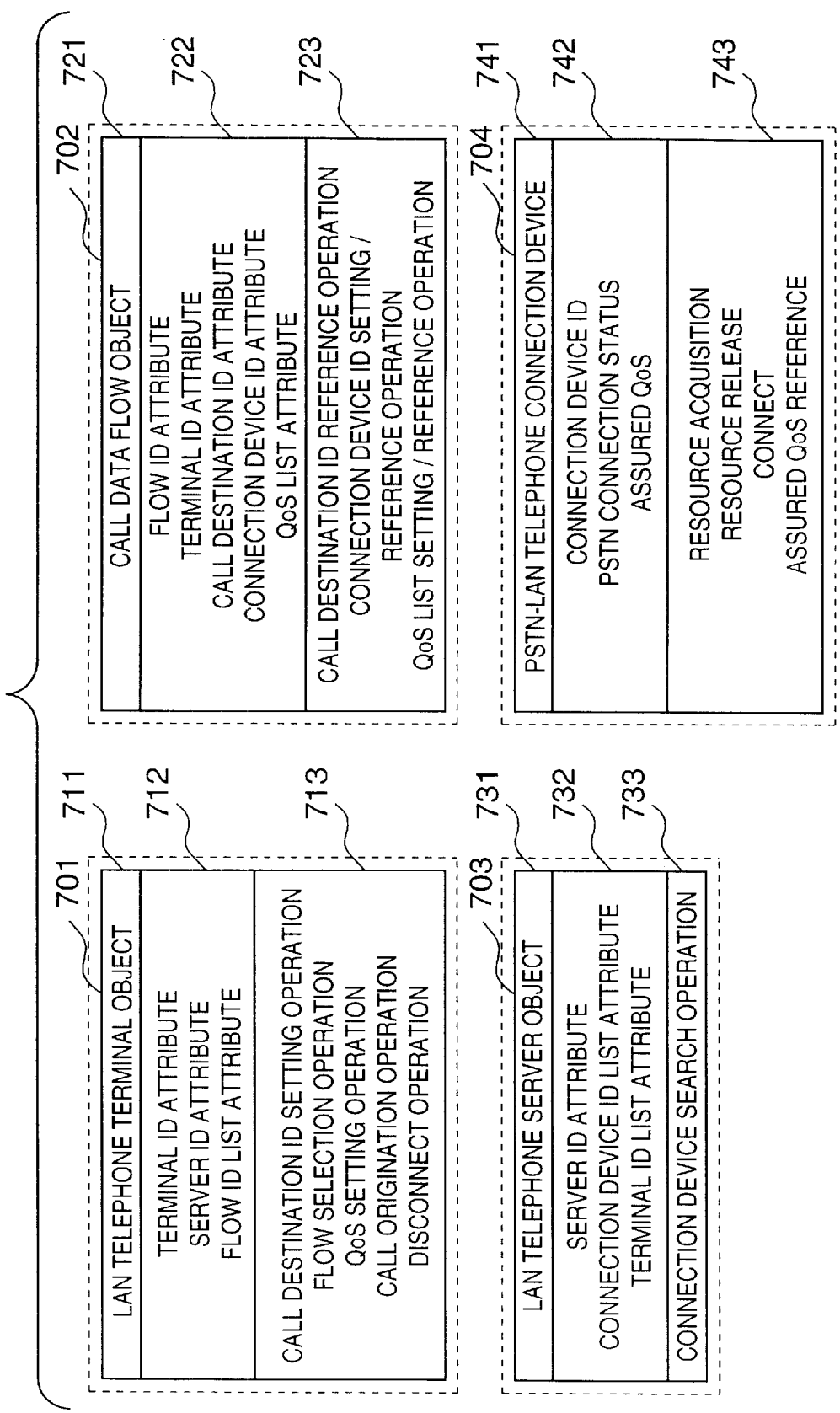
FIG. 7 is a diagram showing the structure of system control data according to the embodiment.

FIG. 7 is a diagram showing the structure of control data in the LAN telephone system 114. The structure of control data of the LAN telephone terminal 111-i is indicated at 701. Numeral 702 denotes the structure of data in the flow of call data, namely flow of data in a voice telephone conversation. Numeral 703 denotes the structure of control data of the LAN telephone server 110, and 704 denotes the structure of control data of the PSTN-LAN telephone connection device 113.

Control attribute data 712 in the LAN telephone terminal 111-i in the data structure 701 comprises a terminal ID for self-identification, a server ID which identifies the server that is the object of management, and a flow ID list which identifies call data flow generated in correspondence with a call destination ID that has been set. Control processing 713 comprises processing for setting the call destination ID, processing for setting QoS(Quality of Service), which stipulates the communications quality requirement, flow selection processing for selecting, from the flow ID list, a flow which is the object of call origination or QoS setting, call origination processing and disconnect processing.

Control attribute data 722 having the call data flow in 702 comprises a flow ID for self-identification, a terminal ID which identifies a terminal serving as the source of call data, a call destination ID which identifies the destination of call data, a connection device ID of a connection device which performs a relay operation, and a QoS list which stipulates the communications quality requirement. Control processing 723 comprises processing for referring to a call destination ID, processing for setting or referring to a connection device ID, and processing for setting or referring to the QoS list.

Control attribute data 732 possessed by the LAN telephone server 110 in 703 comprises a server ID for self-identification, an ID List of connection devices managed by this server, and an ID list of terminals managed by this server. Control processing 733 comprises connection device search processing executed to search for a connection device that satisfies a required QoS.

Control attribute data 742 possessed by the PSTN telephone connection device in 704 comprises a server ID for self-identification, PSTN connection status which holds information indicating whether an accommodated line is in use or not, and assured QoS stipulating the communications quality assured by this device. Control processing 743 comprises resource acquisition processing for requesting the network, to which this device is connected, to reserve the resources that satisfy the QoS required, resource release processing for releasing reserved resources, connect processing for performing connection control, and assured QoS reference processing for referring to an assured QoS.

In FIG. 8, numeral 801 is a block diagram of a QoS list retained in the control data 722 of the call data flow shown in FIG. 7. The list is composed of a plurality of QoSs (812-1, . . . , 812-N) and a length 811 indicating the number thereof. Any QoS 812-i is composed of average bit rate 821, maximum bit rate 822, average delay time 823, maximum delay time 824 and packet loss rate 825. The assured QoS of control data attribute 742 in the connection device data structure 704 also has a composition similar to that of QoS 812-i.

Figure 9:
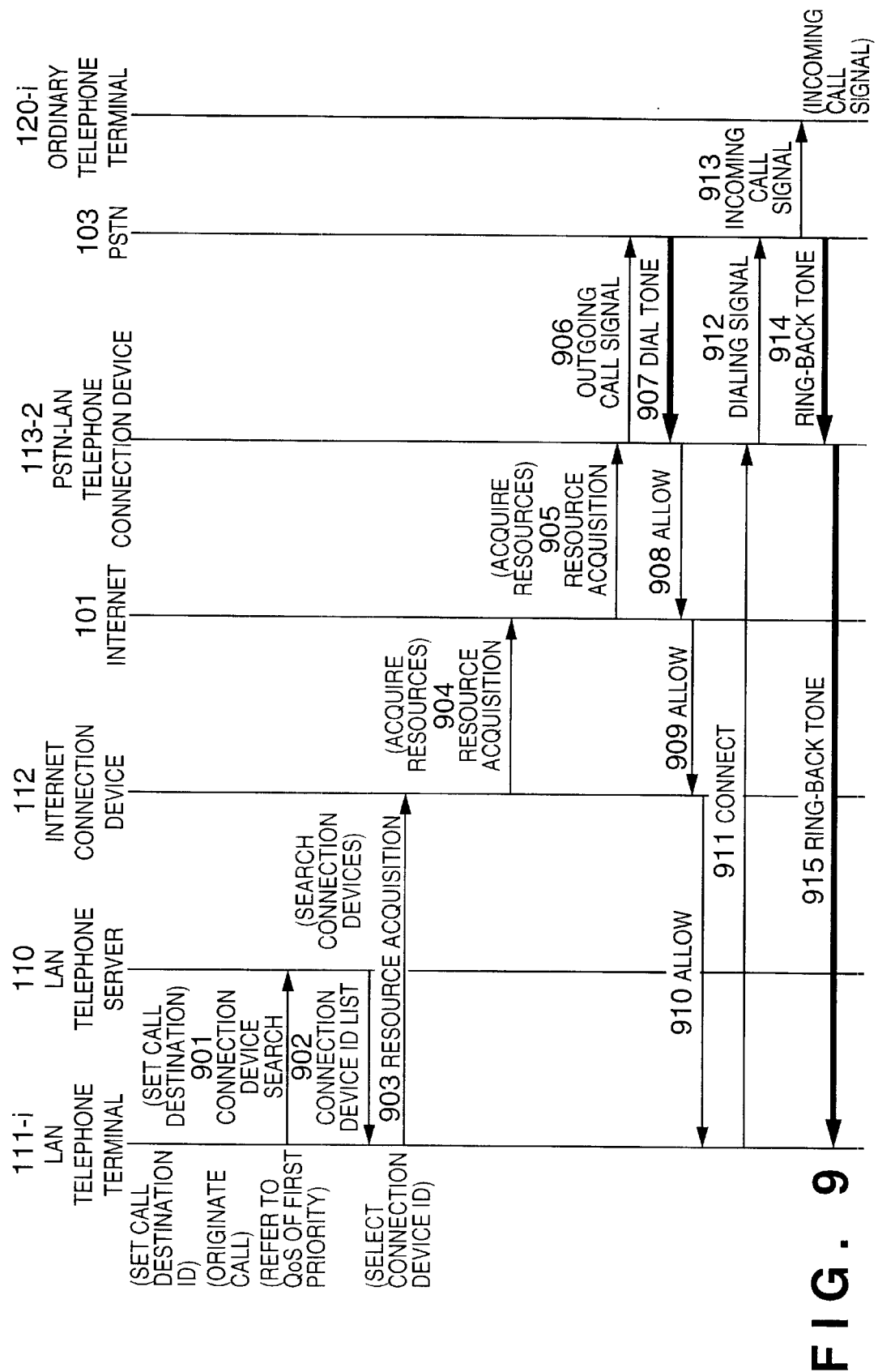
FIG. 9 is a sequence diagram at the time of a first-priority connection in a communications system according to the embodiment.
Figure 10:
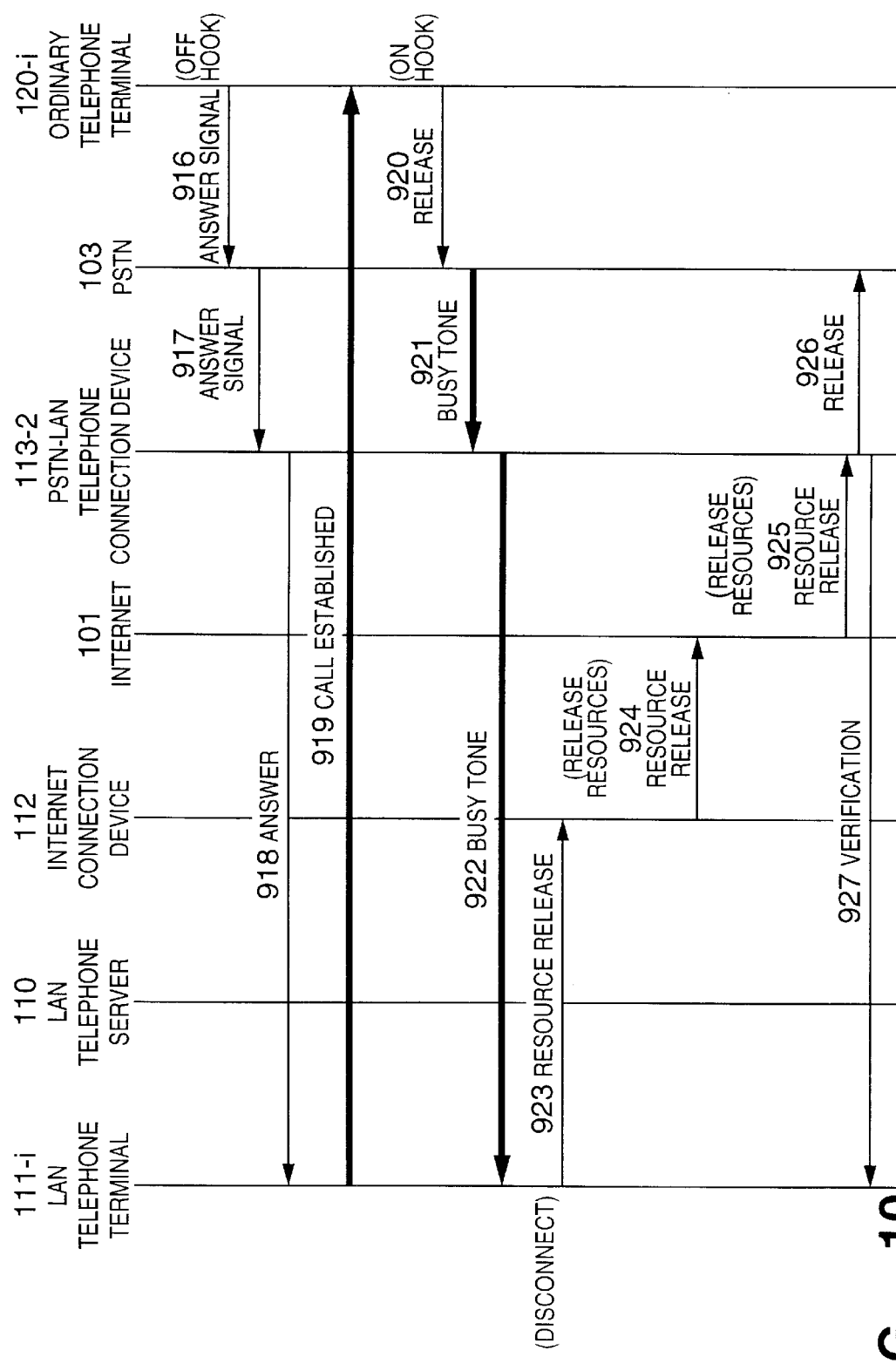
FIG. 10 is a sequence diagram at the time of the first-priority connection in a communications system according to the embodiment.

Next, reference will be had to sequence diagrams shown in FIGS. 9 and 10 to describe an operation through which any LAN telephone terminal 111-i in the LAN telephone system 114 originates a call to any ordinary telephone terminal 120-i, which is connected to the PSTN 103, by placing a call to the PSTN 103 via the Internet connection device 112, Internet 101 and PSTN-LAN telephone connection device 113-2 of the Internet service provider 102.

A call destination ID is set at the LAN telephone terminal 111-i, this call destination is selected by flow selection processing and a call originating operation is performed. As a result, the LAN telephone terminal 111-i reads out QoS-1, on the assumption that the QoS specified as being of first priority by QoS list reference processing of call data flow 702 and the QoSs of FIG. 8 are arranged in decreasing order of priority, and initiates connection device search processing in the LAN telephone server 110 (901). The LAN telephone server 110 searches for a PSTN-LAN telephone connection device 113 that is capable of satisfying QoS-1, which has been reported by the LAN telephone terminal 111-i, and sends the result back to the LAN telephone terminal, 111-i as the connection device ID list (902). The LAN telephone terminal 111-i selects a connection device ID arbitrarily from the connection device ID list that has been obtained. In the description rendered here, it is assumed that the PSTN-LAN telephone connection device 113-2 has been selected. Resource acquisition processing is executed with respect to the PSTN-LAN telephone connection device 113-2. A resource acquisition message that accompanies the resource acquisition processing arrives at the PSTN-LAN telephone connection device 113-2 while resource acquisition is verified at the Internet connection device 112 and Internet 101 along the route (903–905). The PSTN-LAN telephone connection device 113-2 sends an outgoing call signal 906 to the PSTN 103 and sends back an answer 908 to the effect that resource acquisition has been allowed by confirmation of a dial tone 907. This answer arrives at the LAN telephone terminal 111-i via the Internet 101 and Internet connection device 112 along the route (908–910). Upon being allowed acquisition of resources, the LAN telephone terminal 111-i executes processing for connection to the call destination ID in regard to the PSTN-LAN telephone connection device 113-2 (911). In response to the start of connection processing, the PSTN-LAN telephone connection device 113-2 sends a dialing signal 912 to the PSTN 103 based upon dialing information specified by the call destination ID. In response to receipt of the dialing signal 912, the PSTN 103 sends an incoming-call signal 913 to the ordinary telephone terminal 120-i specified by the dialing number and sends a ring-back tone 914 to the PSTN-LAN telephone connection device 113-2. The latter converts the ring-back tone 914, which is an analog signal, to voice data 915 in accordance with TCP/IP and then sends this data to the LAN telephone terminal 111-i. Upon receiving the ring-back tone 915, which is now the voice data in accordance with TCP/IP, the LAN telephone terminal 111-i converts this back to an analog signal and outputs the signal from a voice output unit such as a speaker. If the user of the ordinary telephone terminal 120-i at which the incoming call was received answers (i.e., takes the receiver off the hook), an answer signal 916 is sent to the PSTN 103. The latter receives this signal and sends an answer signal 917, which is sensed by the PSTN-LAN telephone connection device 113-2. The latter then sends an answer 918 to the LAN telephone terminal 111-i. The latter receives the answer 918 and establishes a telephone call 919.

When the call ends and the ordinary telephone terminal 120-i is hung up, the PSTN 103 is released (920) and a busy signal 921 sent from the PSTN 103 in response is converted to a busy signal 922 in accordance with TCP/IP by the PSTN-LAN telephone connection device 113-2. The busy signal 922 is sent to the LAN telephone terminal 111-i. Resource release processing is started with respect to the PSTN-LAN telephone connection device 113-2 by a disconnect operation performed at the LAN telephone terminal 111-i. Resource release reaches the PSTN-LAN telephone connection device 113-2 (923–925) while resource release processing is executed by the Internet connection device 112 and Internet 101 along the route. After the PSTN 103 is released, verification 927 is sent back and call processing is terminated.

Figure 11:
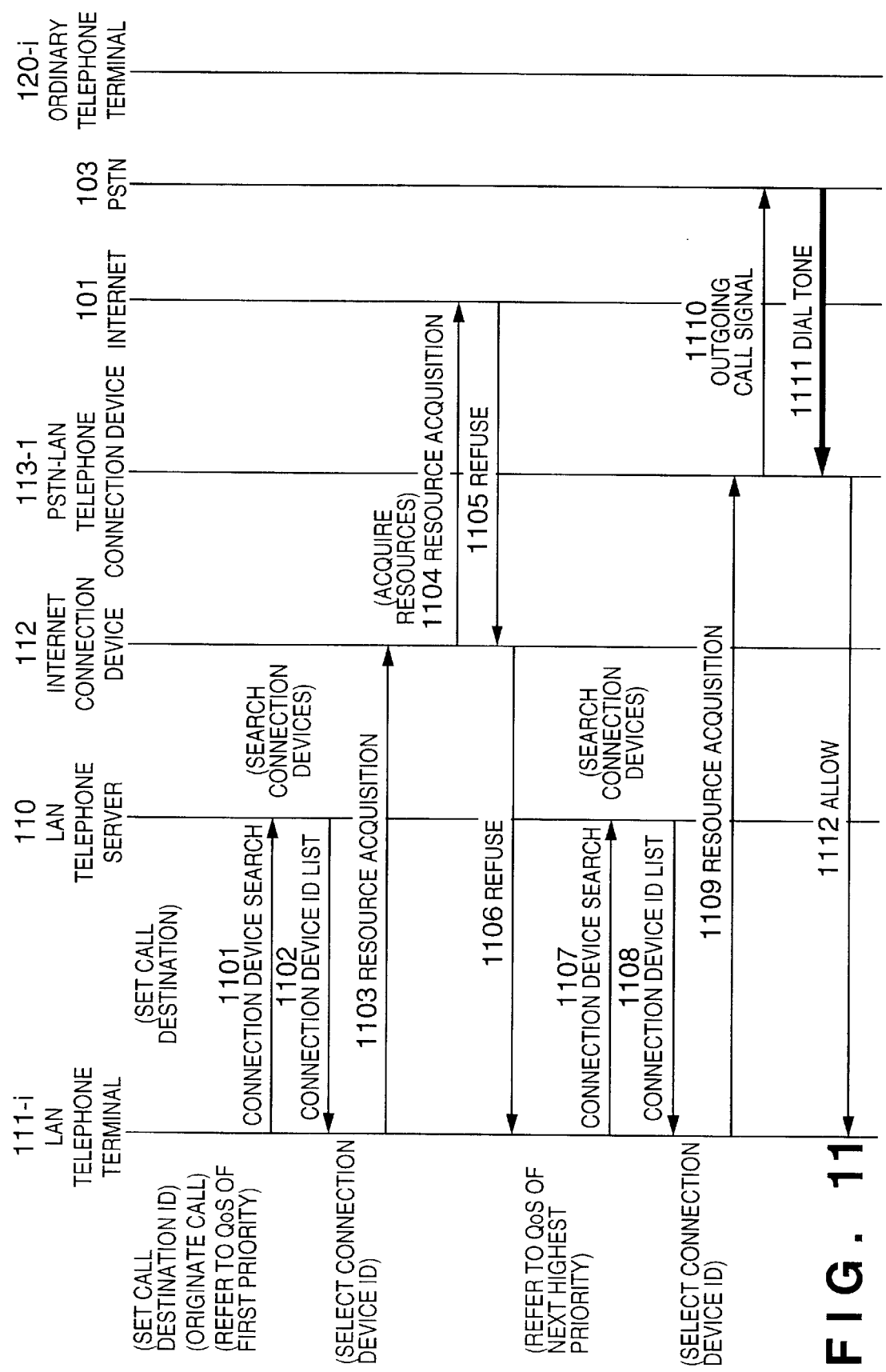
FIG. 11 is a sequence diagram at the time of a second-priority connection in a communications system according to the embodiment.
Figure 12:
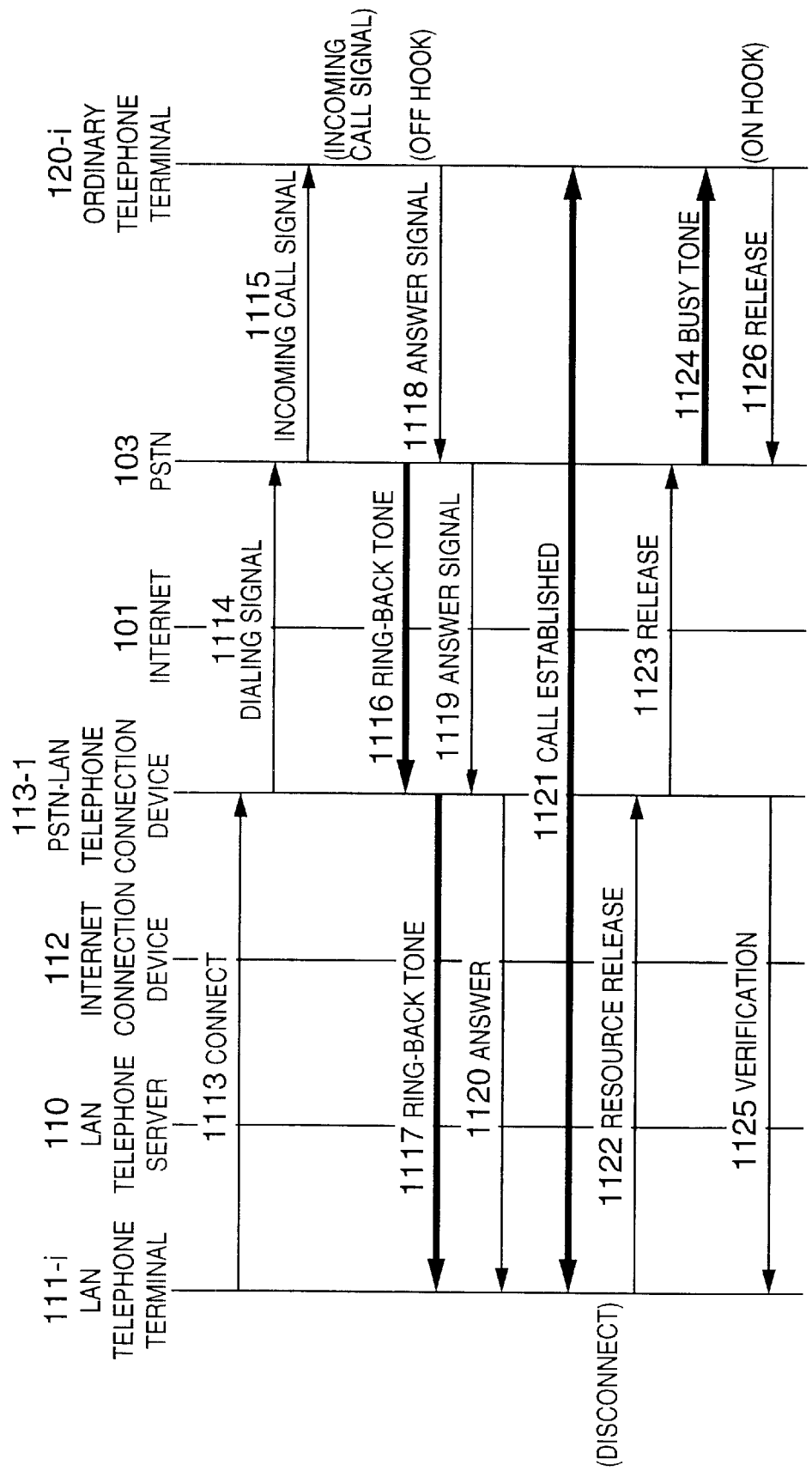
FIG. 12 is a sequence diagram at the time of the second-priority connection in a communications system according to the embodiment.

Next, reference will be had to the sequence diagrams of FIGS. 11 and 12 to describe operation in a case where a telephone call is made while changing a required QoS from the first priority to the next priority.

In a manner similar to the case shown in FIGS. 9 and 10, connection-device search processing 1101 under the conditions of QoS-1 is started with respect to the LAN telephone server 110 by setting the destination ID and originating a call at LAN telephone terminal 111-i, and a list 1102 of connection device IDs is obtained. If it is assumed that only the PSTN-LAN telephone connection device 113-2 connected via the Internet 101 has been selected from the connection device ID list in a manner similar to that shown in FIGS. 9 and 10, resource acquisition processing is executed successively by the Internet connection device 112 and Internet 101 (1103, 1104). In a case where resources adequate enough to satisfy the required communications quality QoS-1 are difficult to reserve in the Internet 101, the latter sends back a refusal 1105. The refusal 1105 arrives at the LAN telephone terminal 111-i as refusal 1106 via the Internet connection device 112. Upon receiving the refusal 1106, the LAN telephone terminal 111-i refers to the QoS list of the communications data flow 702 and reads out the QoS having the next highest priority. Connection-device search processing 1107 is executed under QoS-2 through a procedure similar to that in the case of QoS-1, an ID list 1108 of connection devices is acquired and a resource acquisition operation 1109 is performed with respect to the PSTN-LAN telephone connection device 113-1 selected as the device that satisfies QoS-2. The PSTN-LAN telephone connection device 113-1 sends an outgoing call signal 1110 to the PSTN 103, acquires a dial tone 1111 and sends permission 1112 to the LAN telephone terminal 111-*i*. Thereafter, processing is executed through a procedure similar to that of 911–919 of FIGS. 9 and 10 until call establishment 1121. In a case where a disconnect operation is performed first at LAN telephone terminal 111-*i* when the call 1121 is completed, resource release processing is executed with respect to the PSTN-LAN telephone connection device 113-1, the resources of the PSTN 103 are released (1123) and verification 1125 is sent back. Further, owing to the release of resources of the PSTN 103, a busy signal 1124 is sent to the ordinary telephone terminal 120-*i* that engaged in the call and the PSTN 103 is released.

The operation of the LAN telephone terminal 111-*i* will be described with reference to the flowcharts shown in FIGS. 13 to 19. In the processing executed by the LAN telephone terminal 111-*i* shown in FIG. 13, control proceeds to call destination ID setting processing (FIG. 14) (S1311) in response to detection of a call destination ID setting operation ("YES" at step S1301); control proceeds to QoS setting processing (FIG. 15) (S1321) in response to detection of a QoS setting operation ("YES" at step S1302); and control proceeds to call origination processing (FIGS. 16A and 16B) (S1331) in response to detection of a call originating operation ("YES" at step S1303). If a flow selection operation is detected ("YES" at step S1304), a selection (S1341) of call data flow is made and control returns to LAN telephone terminal processing (S1305). If nothing is detected ("NO" at steps S1301–S1304), then LAN telephone terminal processing is repeated (S1305).

Figure 13:
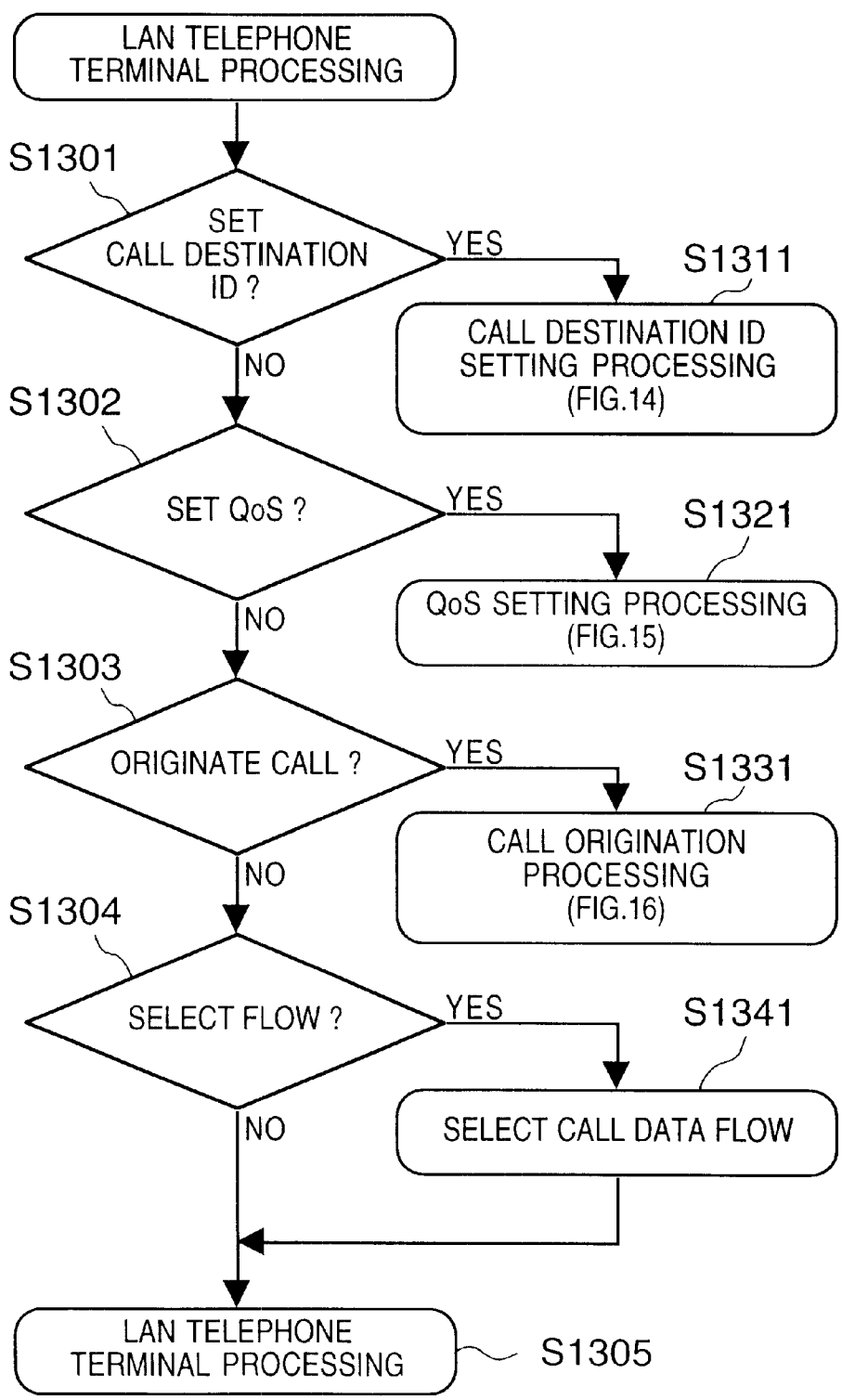
FIG. 13 is a flowchart of LAN telephone terminal processing according to the embodiment.
Figure 14:
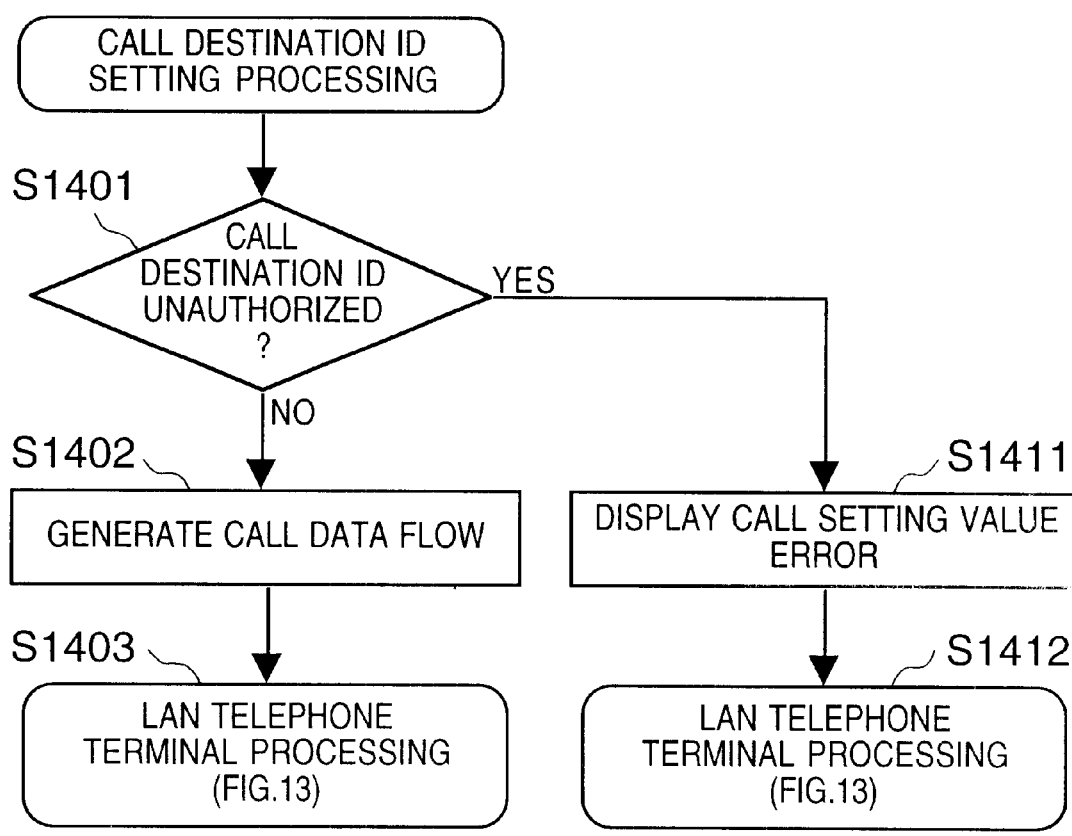
FIG. 14 is a flowchart of processing for setting a call destination ID according to the embodiment.

In call destination ID setting processing shown in FIG. 14, it is determined at the time of the call ID setting operation whether a call destination ID delivered is unauthorized as a call destination ID. If the ID is not unauthorized ("NO" at step S1401), call data flow 702 is generated (S1402) and control returns to LAN telephone terminal processing (FIG. 13). If the call destination ID is unauthorized ("YES" at step S1401), an ID setting value error is display (S1411) and control returns to LAN telephone terminal processing (FIG. 13) (S1412).

Figure 15:
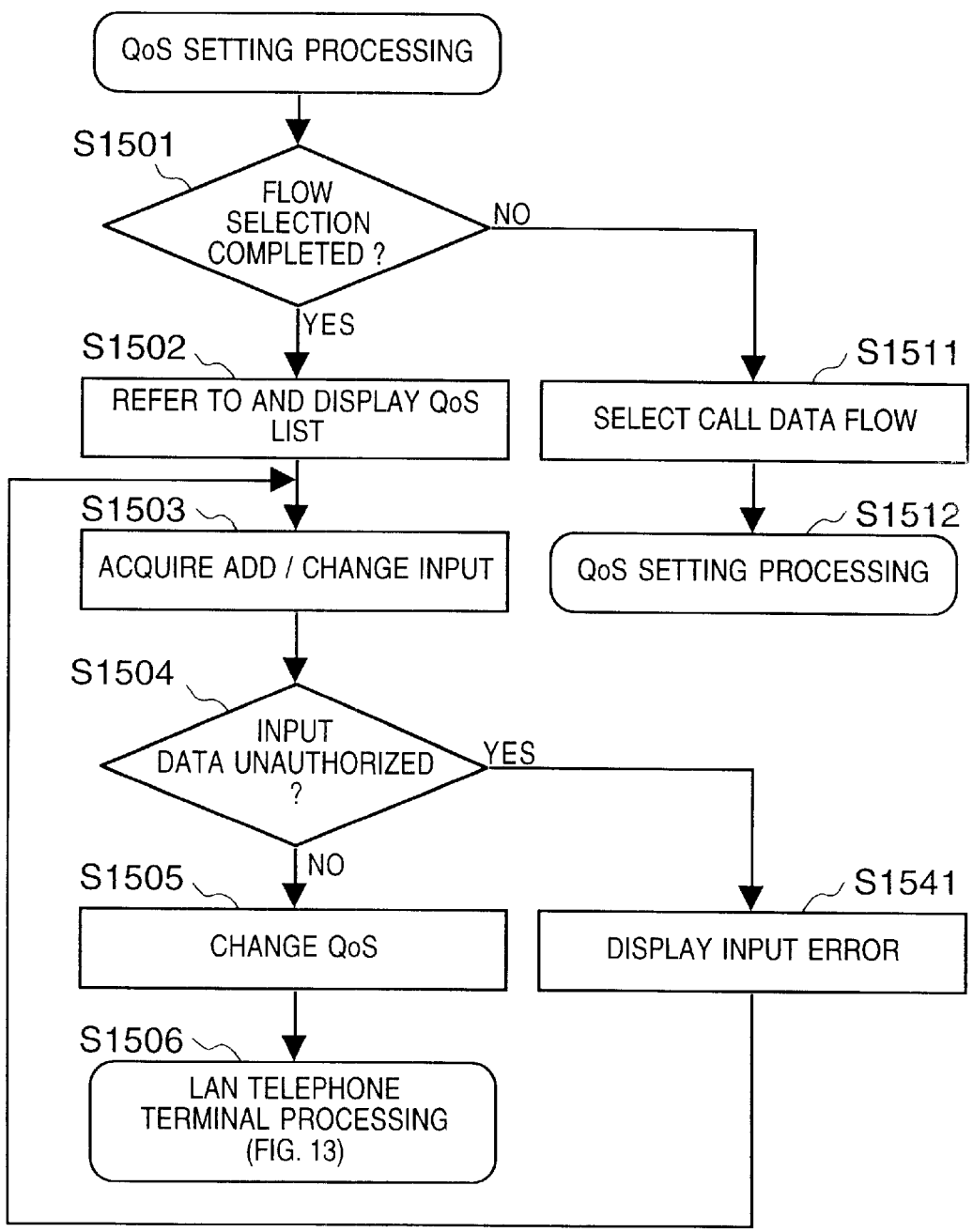
FIG. 15 is a flowchart of processing for setting a QoS according to the embodiment.

In QoS setting processing shown in FIG. 15, it is determined at the time of the QoS setting operation whether a call data flow has been selected. If one has not been selected ("NO" at step S1501), call data flow selection is performed (S1511) and control returns to QoS setting processing (S1512). When the call data flow is selected ("YES" at step S1501), a QoS list of the selected call data flow is referred to and displayed (S1502) and an input for adding to or changing the QoS list from the key input unit 305 is acquired (S1503). Next, it is determined whether the input data is unauthorized (S1504). If the input data is unauthorized ("YES" at step S1504), an input error display is presented (S1541) and control returns to the processing (S1503) for acquiring an addition/change input. If the input data is not unauthorized ("NO" at step S1504), then QoS change processing is executed with respect to the call data flow (S1505) and control returns to LAN telephone terminal processing (FIG. 13) (S1506).

Figure 16A:
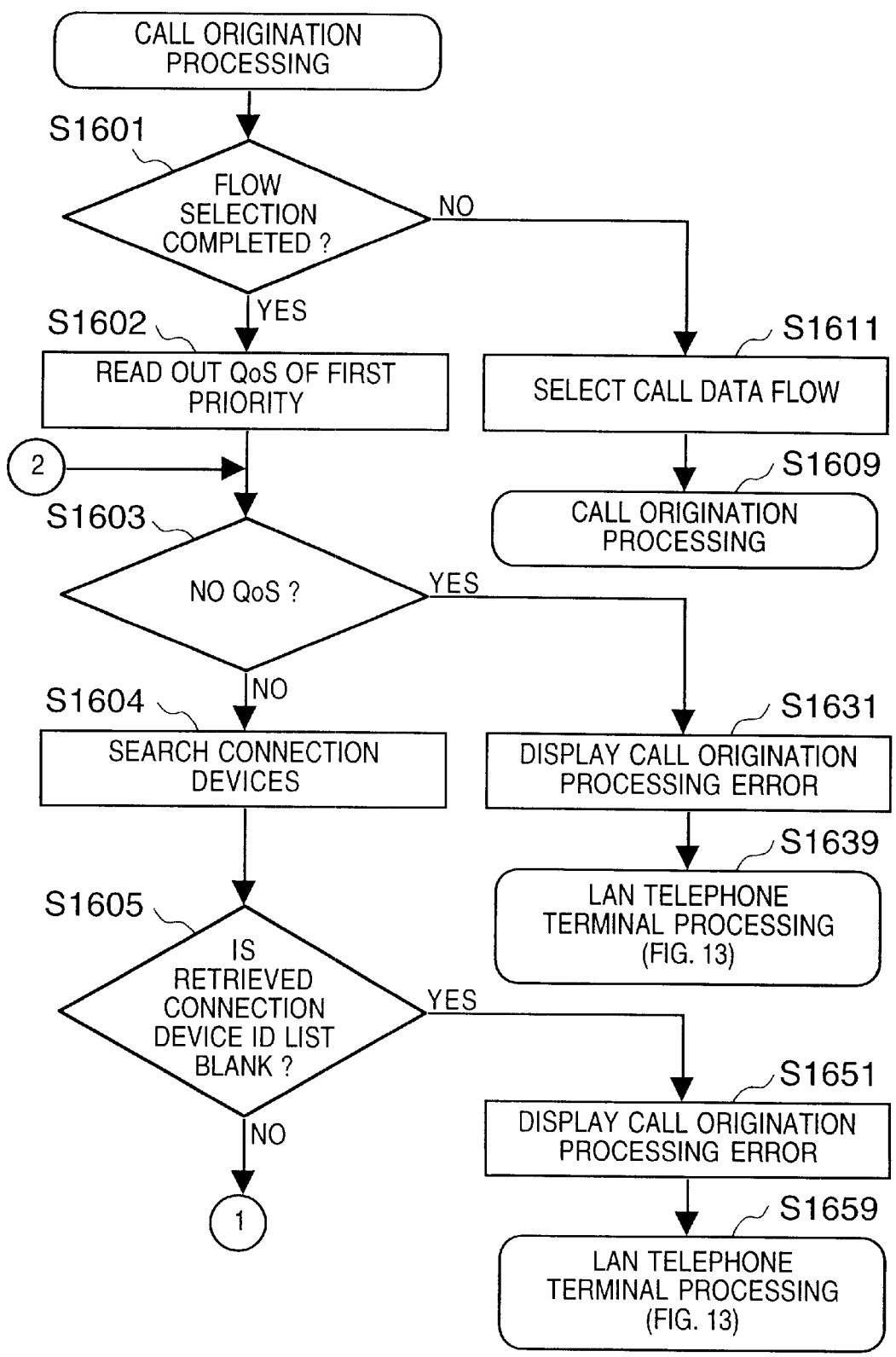
FIGS. 16A and 16B are flowcharts of call origination processing according to the embodiment.
Figure 16B:
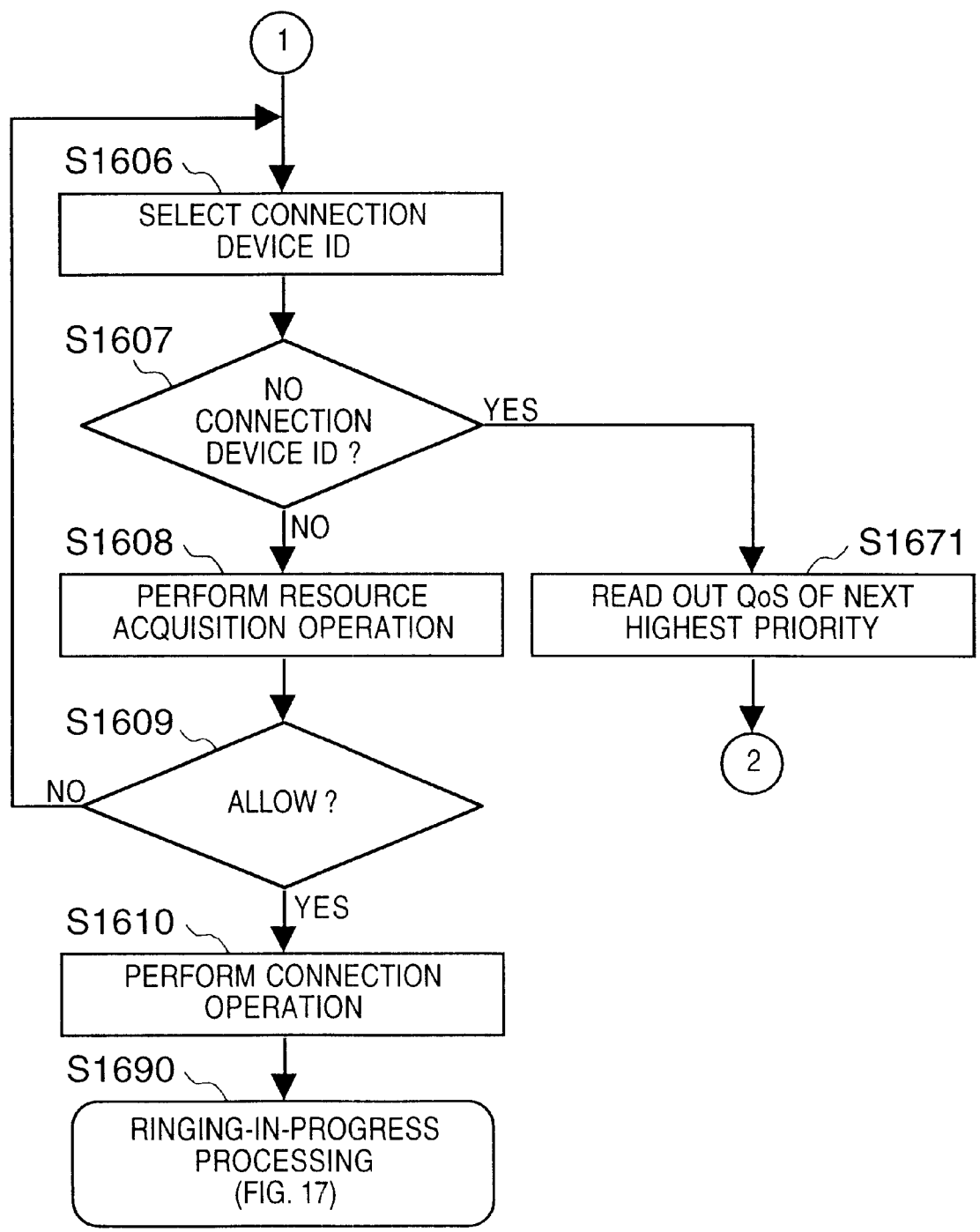

In call origination processing shown in FIGS. 16A and 16B, it is determined at the time of a call originating operation whether a call data flow has been selected (S1601). If a call data flow has not been selected ("NO" at step S1601), call data flow selection is performed (S1611) and control returns to call origination processing (S1619). If call data flow has been selected ("YES" at step S1601), the QoS list of this call data flow is referred to and the QoS of first priority is read out (S1602). If read-out of QoS is not possible ("NO" at step S1603), then the operator performs an operation to have the LAN telephone server 110 search for connection devices that are capable of satisfying this QoS and a list of these connection devices is obtained from the LAN telephone server 110 (S1604). If the connection device ID list acquired from the LAN telephone server 110 is blank ("YES" at step S1605), an origination processing error display is presented (S1651) and control returns to LAN telephone terminal processing (FIG. 13) (S1659). If the connection device ID list is not blank ("NO" at step S1605), one connection device ID is selected (e.g., randomly) and is removed from the connection device ID list (S1606). If a connection device ID is obtained ("NO" at step S1607), then a resource acquisition operation capable of satisfying the selected QoS is started in regard to this connection device (S1608). If acquisition of resources is allowed ("YES" at step S1609), an operation for making a connection to the call destination ID obtained from the call data flow is started (S1610) and control proceeds to ringing-in-progress processing (S1690). If acquisition of resources has been refused ("NO" at step S1609), another connection device ID is selected from the connection device ID list again (S1606). If a connection device ID is not obtained ("YES" at step S1607), i.e., if resource acquisition has been refused with respect to the entire connection device ID list, the QoS having the next highest priority is read out of the QoS list (S1671) and the search for a connection device is started again (S1604). If a QoS having this next highest priority does not exist ("YES" at step S1603), a call origination processing error display is presented (S1631) and control returns to LAN telephone terminal processing (FIG. 13) (S1639).

Figure 17:
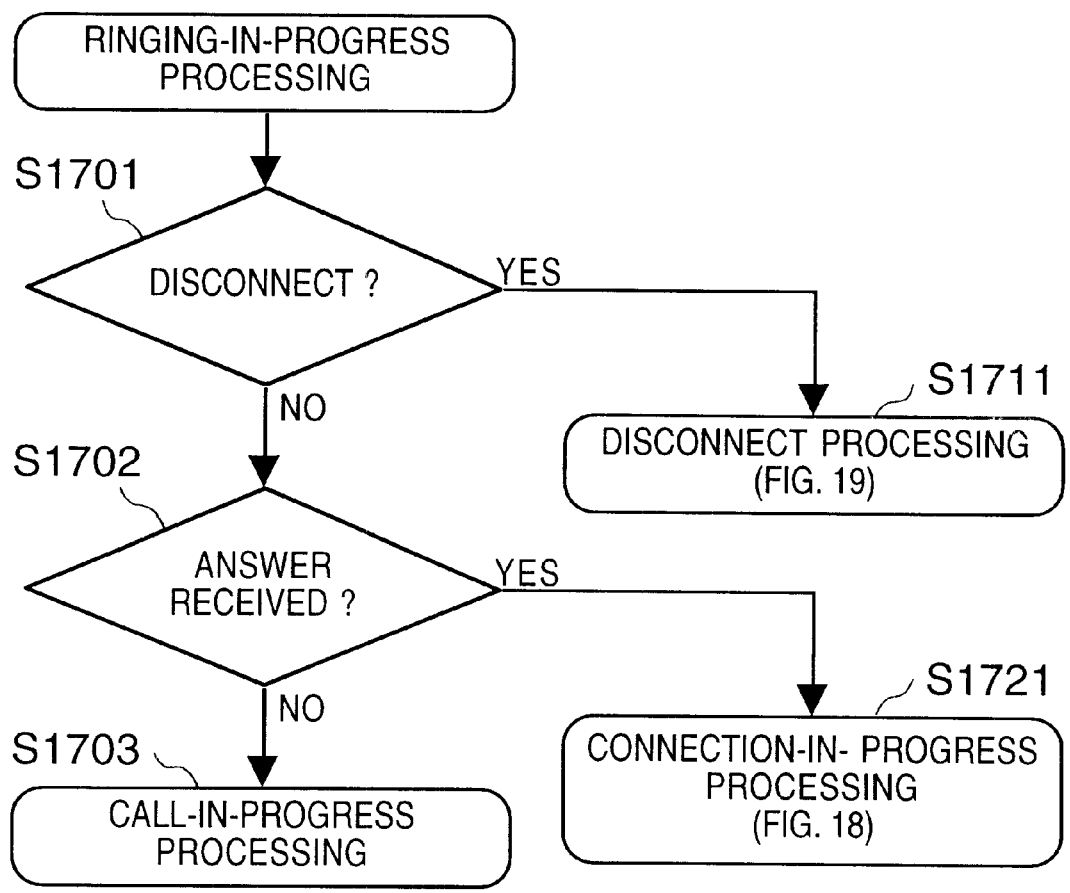
FIG. 17 is a flowchart of ringing-in-progress processing according to the embodiment.

In the ringing-in-progress processing shown in FIG. 17, control proceeds to disconnect processing (FIG. 19) (S1711) if a disconnect operation is sensed ("YES" at step S1701). In an answer is received ("YES" at step S1702), control proceeds to connection-in-progress processing (FIG. 18) (S1721). If a disconnect operation is not sensed and an answer is not received ("NO" at steps S1701, S1702), then ringing-in-progress processing is repeated (S1703).

Figure 18:
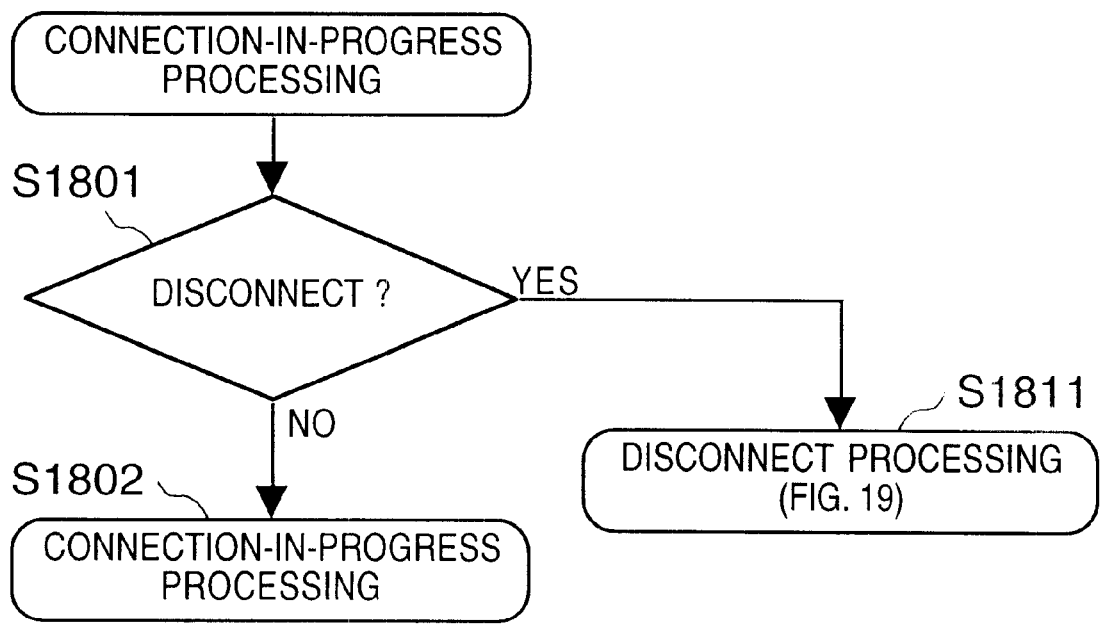
FIG. 18 is a flowchart of connection-in-progress processing according to the embodiment.
Figure 19:
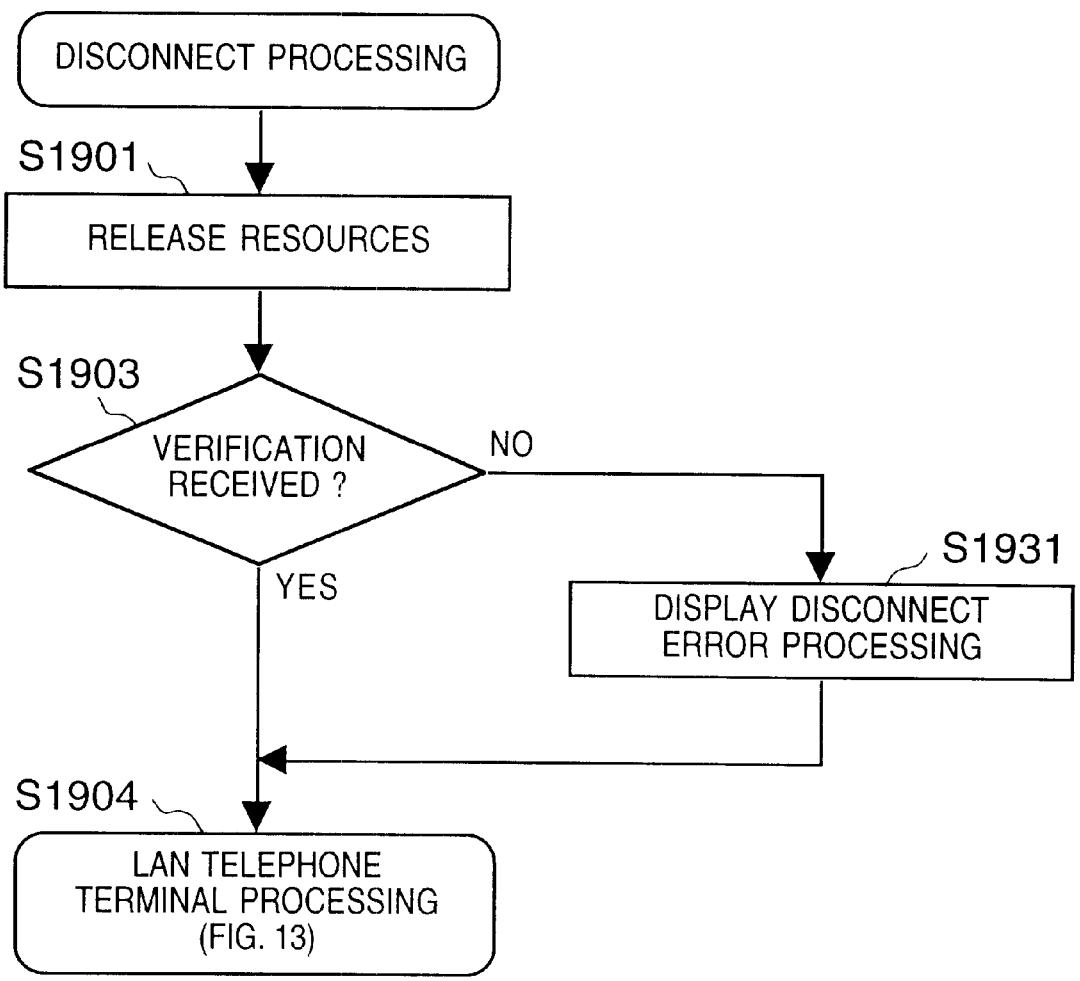
FIG. 19 is a flowchart of disconnect processing according to the embodiment.

In connection-in-progress processing illustrated in FIG. 18, control proceeds to disconnect processing (FIG. 19) (S1811) if a disconnect operation is sensed ("YES" at step S1801). If a disconnect operation is not sensed ("NO" at step S1801), then connection-in-progress processing is repeated (S1802). In disconnect processing shown in FIG. 19, a resource release operation is performed with respect to the connection device currently connected (S1901), verification is received ("YES" at step 1903) and control returns to LAN telephone terminal processing (FIG. 13) (S1904). If verification is not received ("NO" at step S1903), a disconnect processing error is displayed (S1931) and control returns to LAN telephone terminal processing (FIG. 13) (S1904).

The operation of the LAN telephone server 110 will now be described with reference to the flowcharts of FIG. 20 and 21.

Figure 20:
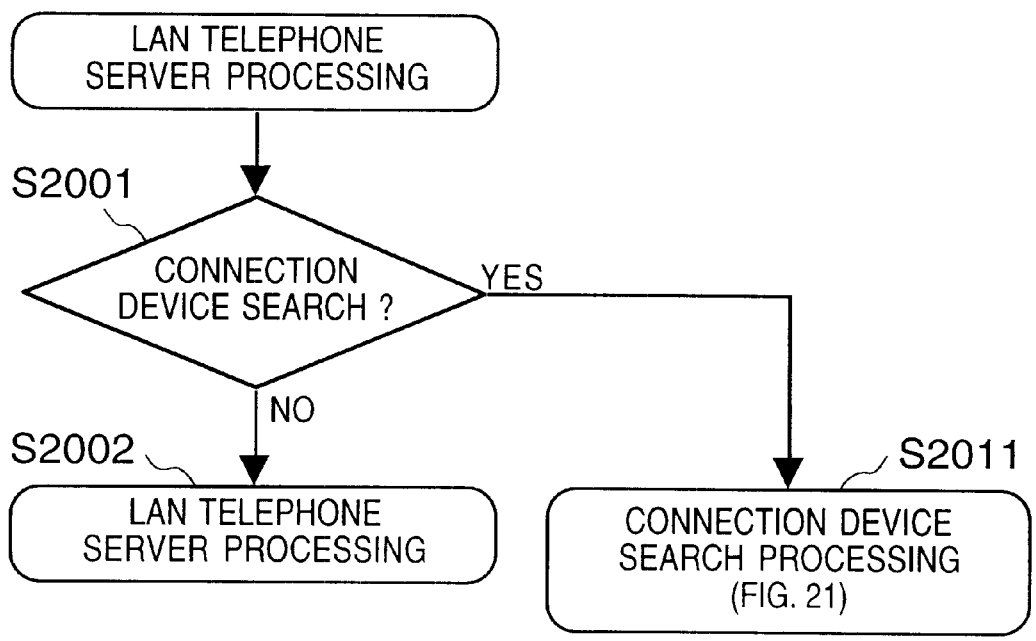
FIG. 20 is a flowchart of LAN telephone server processing according to the embodiment.

In the LAN telephone server processing shown in FIG. 20, control proceeds to connection device search processing (FIG. 21) ("YES" at step S2011) if a connection device search operation is sensed. If this operation is not sensed ("NO" at step S2001), then LAN telephone server processing is repeated (S2002).

Figure 21:
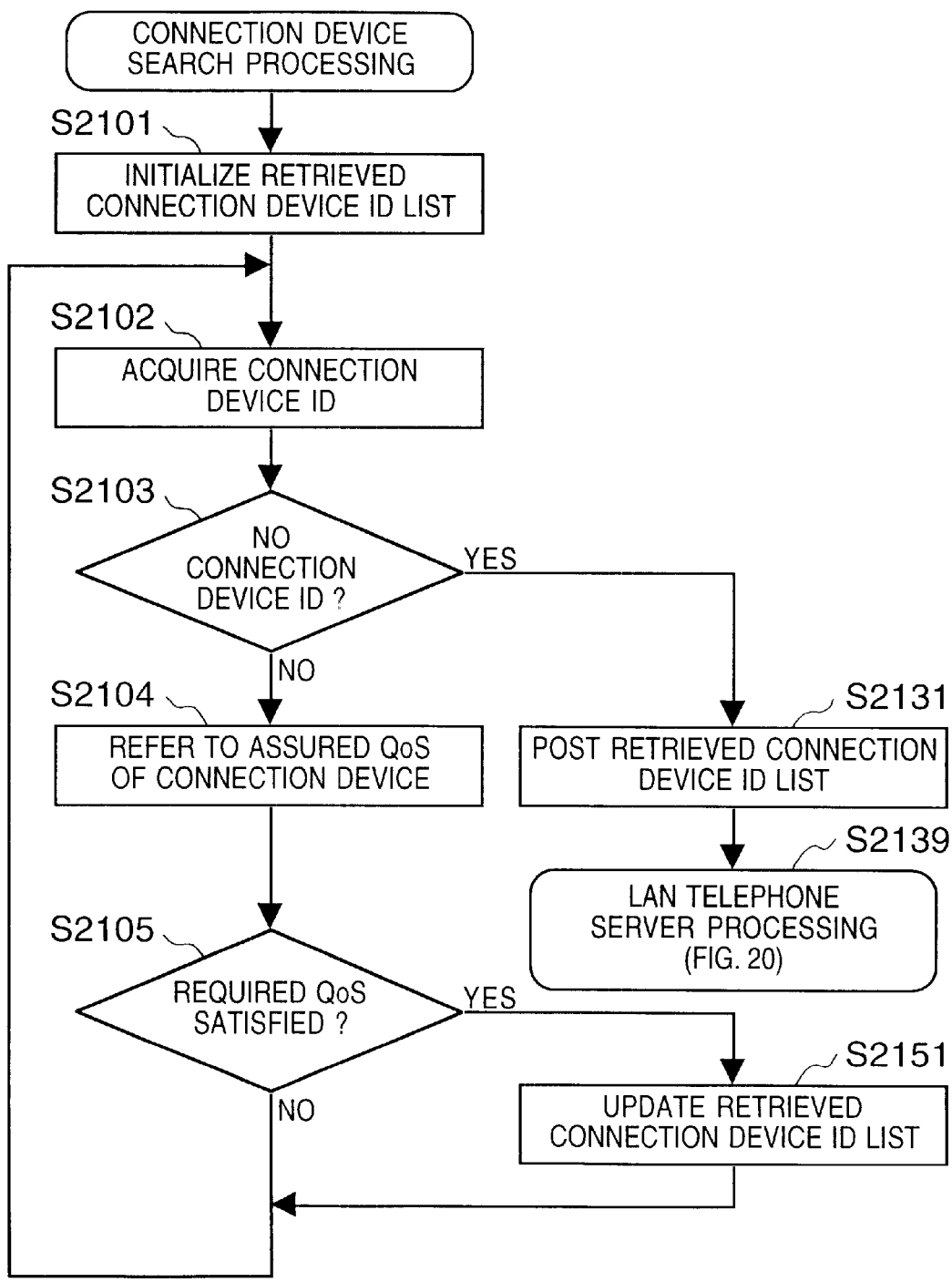
FIG. 21 is a flowchart of connection device search processing according to the embodiment.

In connection device search processing illustrated in FIG. 21, first a retrieved connection device ID list, which is the result of a search, is initialized (S2101) and a connection device ID is acquired from a self-managed connection device ID (S2102). When a connection device ID is acquired ("NO" at step S2103), reference is made to the assured QoS of this connection device (S2104). In a case where this assured QoS satisfies the QoS specified by the LAN telephone terminal 111 when processing is started ("YES" at step S2105), i.e., in a case where the assured values of the average bit rate 821 and maximum bit rate 822 exceed required values from the LAN telephone terminal 111 and the assured values of the average delay time 823, maximum delay time 824 and packet loss rate 825 fall below the required values from the LAN telephone terminal 111, an addition is made to the connection device ID list that is the result of the a search (S2151). If the requirement is not satisfied ("NO" at step S2105), then the next connection device ID is acquired (S2102). In a case where connection device IDs capable of being acquired are no longer available ("YES" at step S2103), the retrieved connection device ID list is posted to the LAN telephone terminal 111 that requested the connection device search (S2131) and control returns to LAN telephone server processing (FIG. (S2139).

Next, the operation of the PSTN-LAN telephone connection device 113 will be described with reference to the flowcharts of FIGS. 22 to 25.

Figure 22:
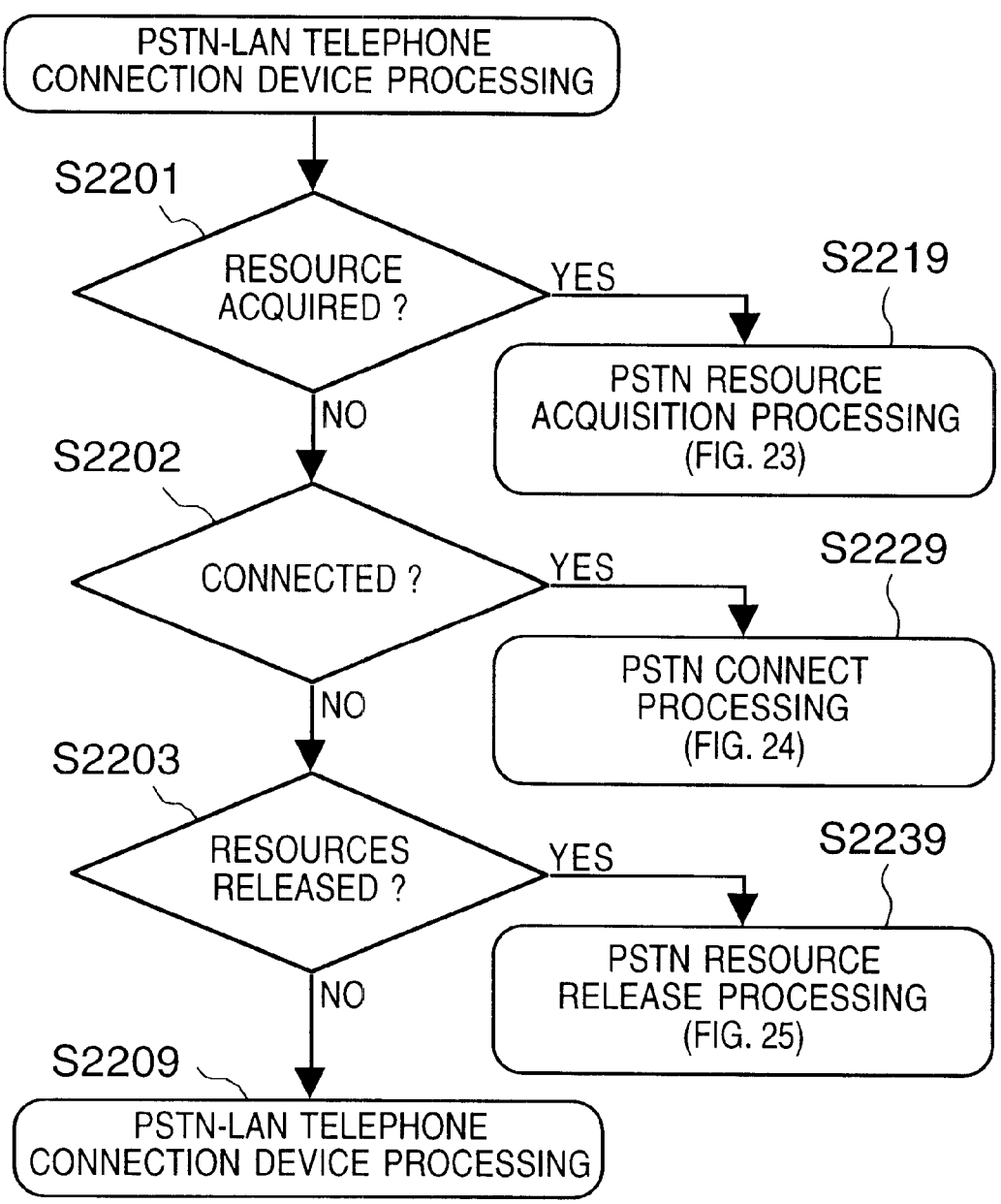
FIG. 22 is a flowchart of PSTN-LAN telephone connection device processing according to the embodiment.

In the processing performed by the PSTN-LAN telephone connection device shown in FIG. 22, control proceeds to PSTN resource acquisition processing (FIG. 23) (S2219) if a resource acquisition operation performed at the LAN telephone terminal 111 is sensed ("YES" at step S2201); to PSTN connect processing (FIG. (S2229) if a connection operation performed at the LAN telephone terminal 111 is sensed ("YES" at step 2202); and to PSTN resource release processing (FIG. 25) (S2239) if a resource release operation performed at the LAN telephone terminal 111 is sensed ("YES" at step S2203). Otherwise ("NO" at steps S2201–S2203), processing executed by the PSTN-LAN telephone connection device is repeated (S2209).

Figure 23:
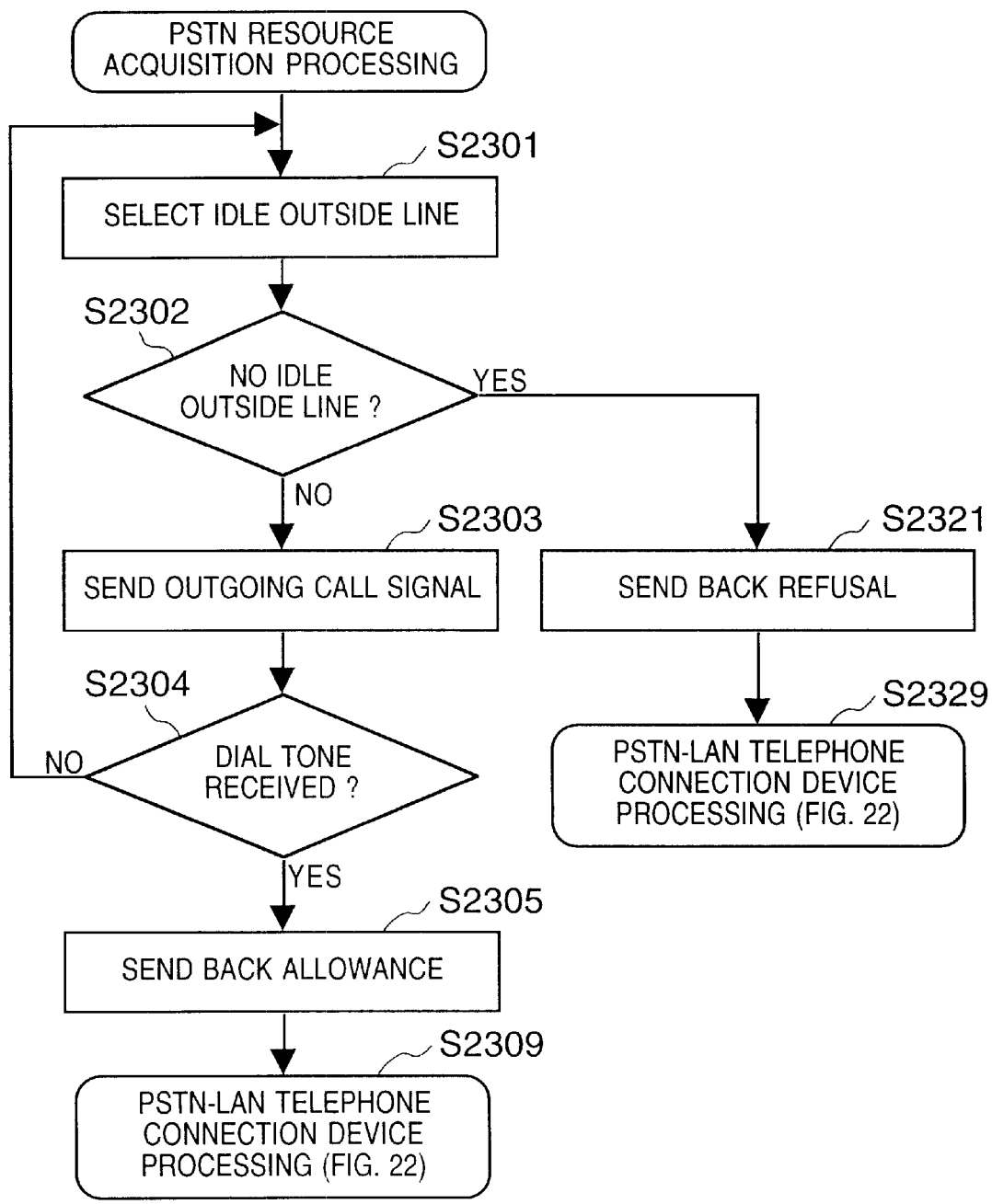
FIG. 23 is a flowchart of PSTN resource acquisition processing according to the embodiment.

In the PSTN resource acquisition processing shown in FIG. 23, an idle outside line is selected (S2301) from the PSTN connection status at 742 in FIG. 7 holding information such as whether the aforementioned accommodated line is in use. If an idle outside line is obtained ("NO" at step S2302), an outgoing call signal is sent to this outside line (S2303). If a dial tone obtained from a network is sensed in response to the outgoing call signal ("YES" at step S2304), permission is sent back to the LAN telephone terminal 111 (S2305) and control returns to the processing (FIG. 22) performed by the PSTN-LAN telephone connection device (S2309). If a dial done cannot be sensed ("NO" at step S2304), another idle outside line is selected again (S2301) and similar processing is executed. If selectable idle outside lines are no longer available ("YES" at step S2302), refusal is sent back to the LAN telephone terminal 111 (S2321) and control returns to the processing (FIG. 22) performed by the PSTN-LAN telephone connection device (S2329).

Figure 24:
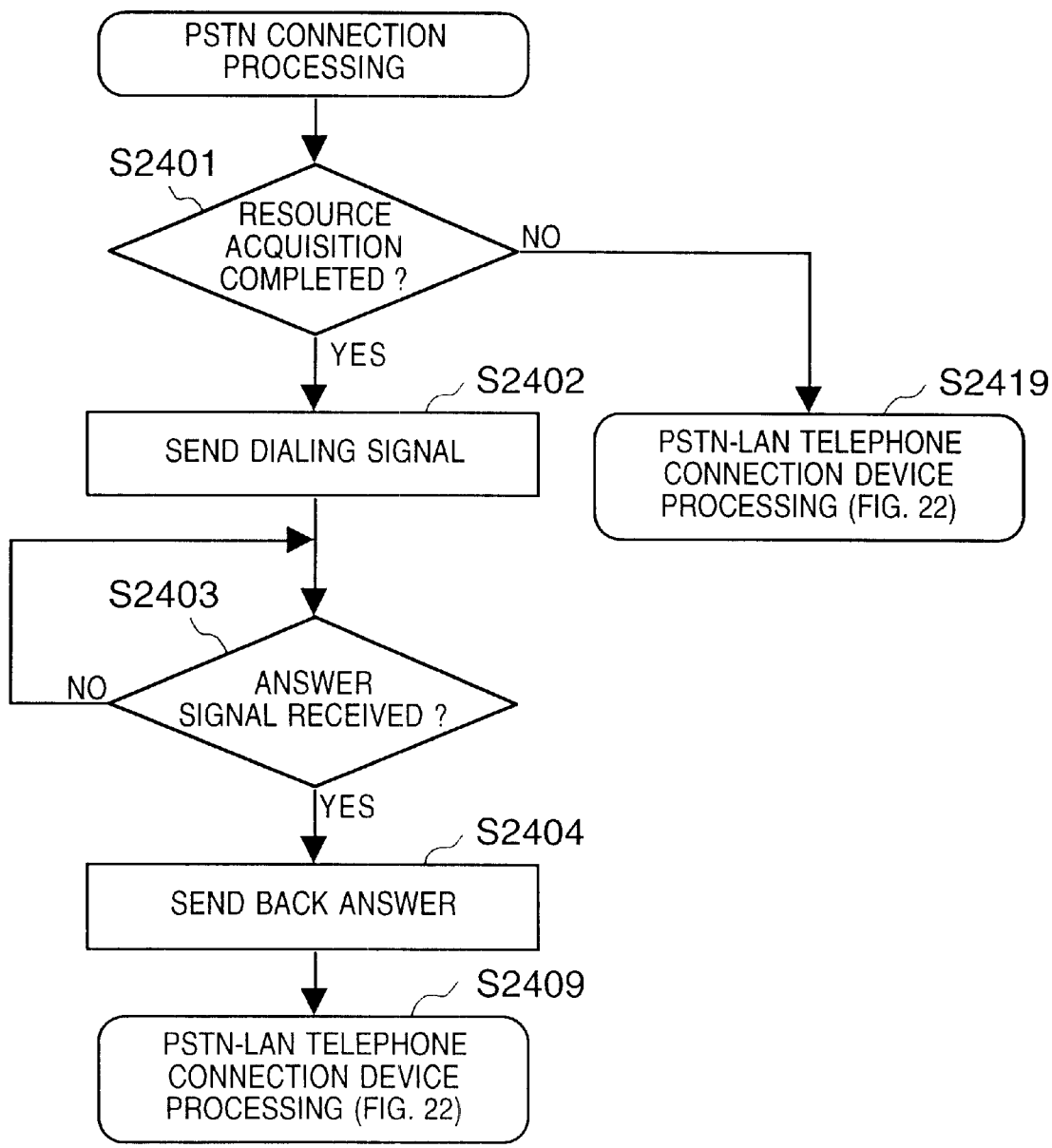
FIG. 24 is a flowchart of PSTN connect processing according to the embodiment.
Figure 25:
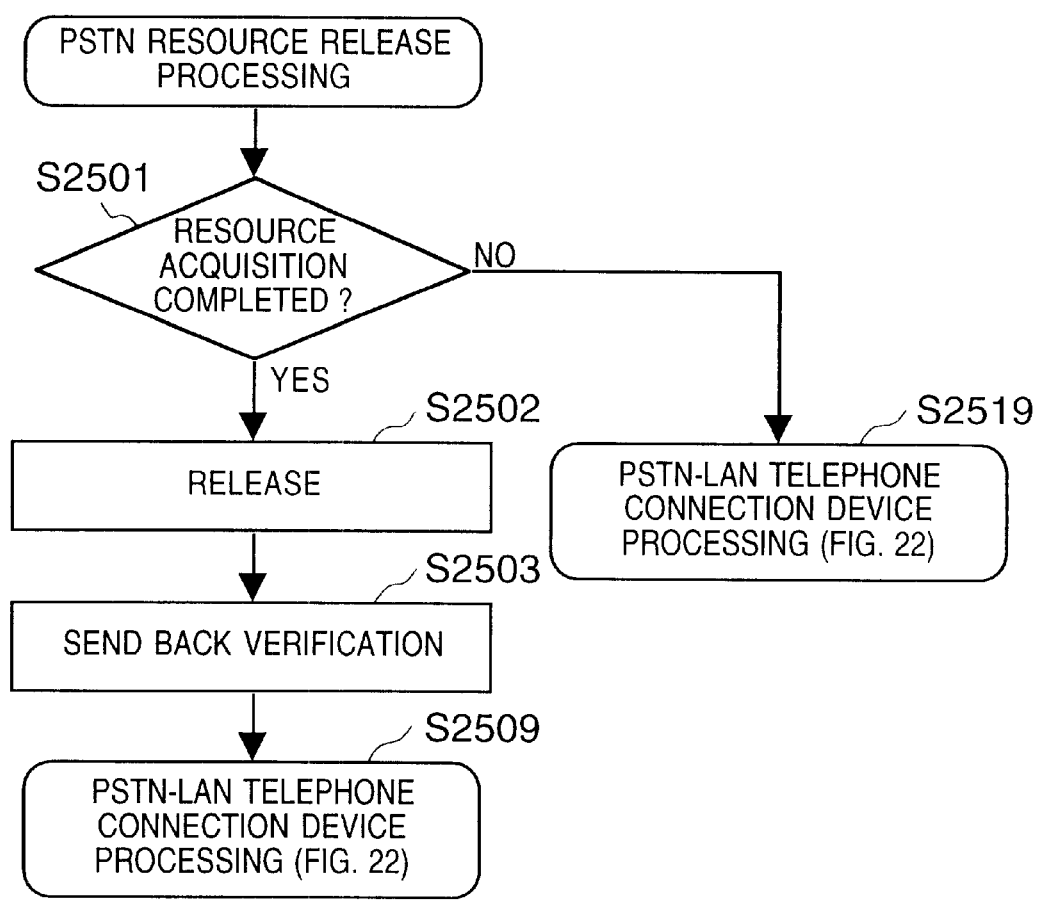
FIG. 25 is a flowchart of PSTN resource release processing according to the embodiment.

In PSTN connect processing shown in FIG. 24, first it is determined whether resources have been reserved, i.e., whether an outside line has been acquired and a call originated (S2401). If resources have not been reserved ("NO" at step S2401), control returns to the processing (FIG. 22) performed by the PSTN-LAN telephone connection device (S419). If resources have been reserved ("YES" at step S2401), a dialing signal based upon a call destination ID obtained from the LAN telephone terminal 111 at the time of processing start-up is sent (S2402) and an answer signal from the other party's telephone terminal is awaited ("NO" at step S2403). If an answer signal is received ("YES" at step S2403), an answer is sent back to the LAN telephone terminal 111 (S2404) and control returns to the processing (FIG. 22) performed by the PSTN-LAN telephone connection device (S2409). In a case where resource release processing has been started up in a waiting state which lasts until the answer signal is received, control returns to the PSTN resource release processing of FIG. 25, though this is not illustrated In the PSTN resource release processing shown in FIG. 25, first it is determined whether resources have been reserved (S2501) in a manner similar to that of the PSTN connect processing of FIG. 24. If resources have not been reserved ("NO" at step S2501), then control returns to the processing (FIG. 22) performed by the PSTN-LAN telephone connection device (S2519). If resources have been reserved ("YES" at step S2501), then the network (PSTN 103) is released (S2502), verification is sent back to the LAN telephone terminal 111 (S2503) and control returns to the processing (FIG. 22) performed by the PSTN-LAN telephone connection device (S2509).

Thus, in accordance with this embodiment, communications quality required for communications, such as average bit rate, maximum bit rate, average delay time, maximum delay time and packet loss rate can be selected flexibly in dependence upon the status of the network.

Further, selection of communication quality is performed automatically. This makes it possible to perform communication at optimum communications quality in a manner transparent to the user.

Further, the user is capable of setting a plurality of communications qualities having different priorities.

When communication is carried out via networks the communications schemes whereof differ from one another, particularly networks such a LAN, the Internet and a PSTN, optimum communication quality can be selected. In addition, the optimum network can be selected automatically.

Second Embodiment

Next, there will be described a second embodiment in which the QoS list 801 of FIG. 8 according to the first embodiment is changed to a QoS list 803 of FIG. 26 and a cost calculation table 600 shown in FIG. 6 is added on.

The cost calculation table 600 shown in FIG. 6 is capable of being referred to by the LAN telephone server 110 and retains, in a table format, telephone call charges based upon the PSTN-LAN telephone connection devices 113-1 to 113-N, which are managed by the LAN telephone server 110, and call destination ID areas (toll numbers in this case).

Figure 26:
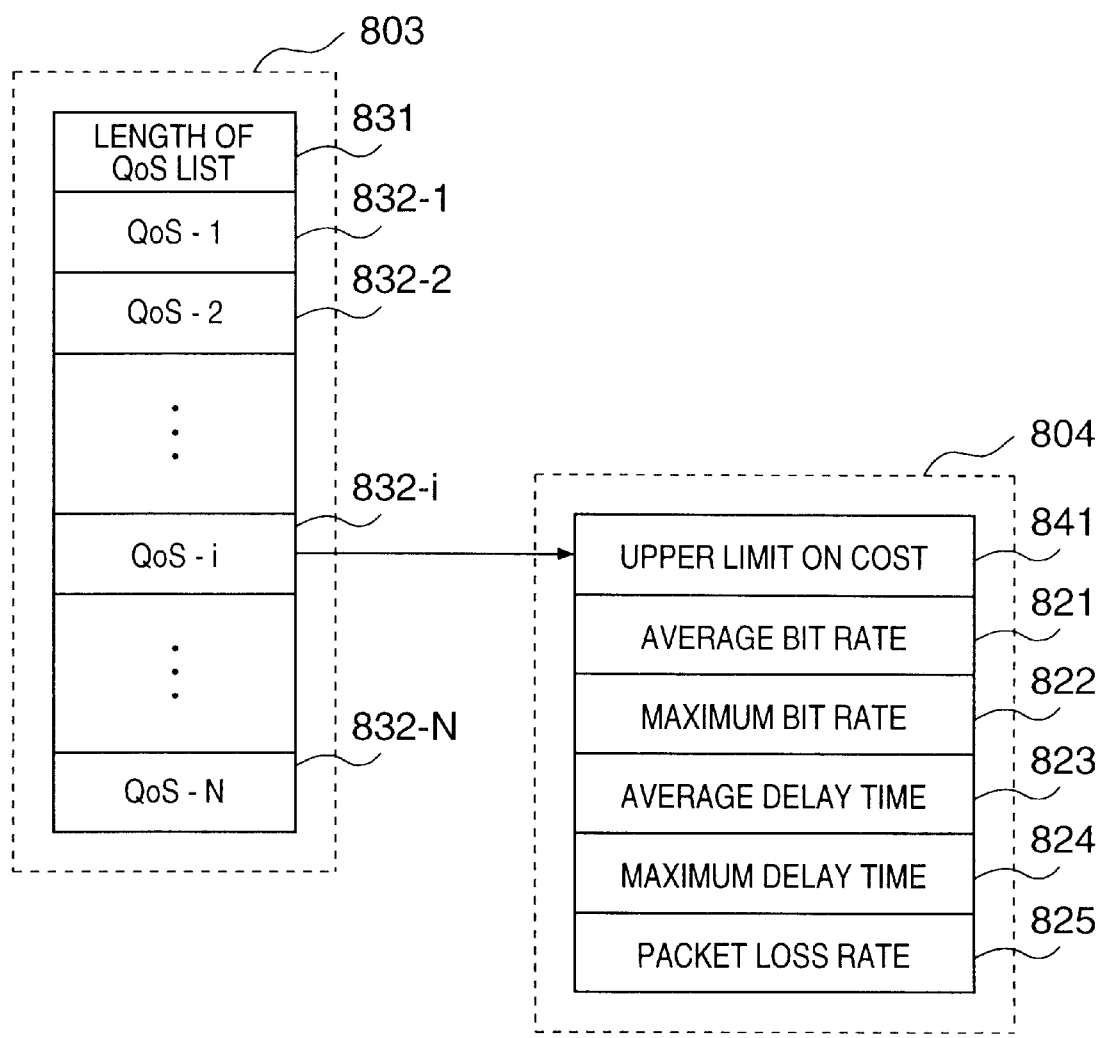
FIG. 26 is a diagram showing the structure of communications quality data according to the second embodiment of the present invention.

The QoS list 803 of FIG. 26 is the result of adding, onto the QoS list 801 of FIG. 8, an upper limit 841 on cost permitted in order to obtain the particular QoS.

The operation involved will now be described. The basic operation, which is similar to that of the first embodiment, is to change the decision (S2105), as to whether the required QoS is satisfied or not, in the connection device search processing (FIG. 21) of the LAN telephone server 110 in such a manner that use is made of the cost calculation table 600 and QoS list 803. That is, in the processing (S2105) for judging whether the requirement is satisfied or not, the desired unit charge is read out of the cost calculation table 600 and a decision is rendered to the effect that the required QoS is satisfied if two conditions are met, namely that the value of the desired unit charge is less than the upper limit 841 on cost and that the conditions set forth in the first embodiment are satisfied.

In accordance with this embodiment, it is possible to select the optimum communications quality that takes communications cost into consideration as one element of communications quality.

It should be noted that an arrangement may be adopted in which the functions of the first and second embodiments are supplemented by reporting to the user the communications quality that has been automatically selected. More specifically, the content of the automatically selected communications quality may be displayed on the display unit of a LAN telephone terminal so that the user may refer to it when setting the QoS.

Further, in order to make the communications quality reported to the user easier to understand, QoS-1 to QOS-N of FIGS. 8 and 26 can be associated with levels 1 to N in the order of priority and the level that corresponds to the automatically selected QoS can be displayed.

Thus, in accordance with the present invention, as described above, communications quality required for communications, such as average bit rate, maximum bit rate, average delay time, maximum delay time and packet loss rate can be selected flexibly and optimally in dependence upon the status of the network.

Further, the selection of communications quality is performed automatically. This makes it possible to perform communication at optimum communications quality in a manner transparent to the user.

Further, the user is capable of setting a plurality of communications qualities having different priorities.

When communication is carried out via networks the communications schemes whereof differ from one another, particularly networks such a LAN, the Internet and a PSTN, optimum communication quality can be selected. In addition, the optimum network can be selected automatically.

As many apparently widely different embodiments of the present invention can be made without departing from the spirit and scope thereof, it is to be understood that the invention is not limited to the specific embodiments thereof except as defined in the appended claims.

What is claimed is:

1. A communications system having a plurality of connection devices for connection to a plurality of communications networks, a communications apparatus capable of communicating with the connection devices, and a management apparatus for performing management relating at least to communication by the communications apparatus, said system comprising:

storage means for storing a plurality of communications qualities necessary for communications by the communications apparatus;

selection means for selecting at least one connection device based upon the plurality of communications qualities stored in said storage means;

communications resources acquisition means for acquiring communications resources in order to perform communication via the connection device selected by said selection means; and notification means for posting information that is based upon a communications quality assured by the connection device that has been selected, wherein said selection means is possessed by said management apparatus.

2. A method for controlling a communications system having a plurality of connection devices for connection to a plurality of communications networks, a communications apparatus capable of communicating with the connection devices, and a management apparatus for performing management relating at least to communication by the communications apparatus, said method comprising:

a storage step of storing a plurality of communications qualities necessary for communications by the communications apparatus;

a selection step of selecting at least one connection device based upon the plurality of communications qualities stored at said storage step;

a communications resources acquisition step of acquiring communications resources in order to perform communication via the connection device selected at said selection step; and a notification step of posting information that is based upon a communications quality assured by the connection device that has been selected, wherein said selection step is implemented by said management apparatus.

3. The method according to claim 2, wherein the communications qualities includes a plurality of parameters, and said storage step stores a plurality of communications qualities which include the plurality of parameters.

4. The method according to claim 2, wherein the communications qualities include a least one of average bit rate, maximum bit rate, average delay time, maximum delay time, packet loss rate and upper limit on communications cost, which are required for communications.

5. The method according to claim 2, wherein the plurality of communications networks include at least one of a local area network, a public network and the Internet.

6. The method according to claim 2, wherein one of the plurality of communications networks is the Internet.

7. The method according to claim 2, wherein the communications qualities are capable of being selected beforehand by an operator.

8. The method according to claim 2, wherein said storage step is implemented by said communications apparatus.

9. The method according to claim 2, wherein said communications resources acquisition step is implemented by said connection devices.

10. The method according to claim 2, wherein a plurality of communications qualities stored at said storage step are ranked by priority.

11. The method according to claim 10, wherein in a case where communication cannot be performed via a first connection device that has been selected based upon a communications quality having a first priority, said selection step selects a second connection device based upon a communications quality having a second priority.

12. The method according to claim 11, wherein the case where communication cannot be performed via said first connection device is a case where communications resources cannot be acquired at said communications resources acquisition step.

13. A communications system having a plurality of connection devices for connection to a plurality of communication networks, a communications apparatus capable of communicating via the connection device, and a management apparatus for performing management relating at least to communication by the communications apparatus, wherein:

said management apparatus comprises notification means for notifying said communications apparatus of the connection device, which can provide a transmission quality requested by said communications apparatus, in response to such request from said communications apparatus; and said communications apparatus comprises:

communications resources acquisition request means for requesting the connecting device designed by the management means to acquire communications resources that provide a desired transmission quality; and communications means for communicating via said connection device based on a response from the connection device requested to acquire the communications resources.

14. A method controlling a communications system having a plurality of connection devices for connection to a plurality of communication networks, a communications apparatus capable of communicating via the connection device, and a management apparatus for performing management relating at least to communications by the communications apparatus, said method comprising:

a notifying step in which said management apparatus notifies said communications apparatus of that connection device which can provide the transmission quality requested by said communications apparatus in response to such request from said communications apparatus, a communications resources acquisition request step in which said communications apparatus posts to the connecting device designated by the management means a request for acquisition of communications resources that provide a desired transmission quality; and a communications step in which said communications apparatus communicates via said connection device based on a response from the connection device that received the request for acquisition of communications resources.

15. The method according to claim 14, wherein in the communications resources acquisition request step, if the desired transmission quality cannot be acquired by the communications via the connection device that received the request for acquisition of communications resources, another request is posted to another connecting device for communications resources that provide the desired transmission quality.

16. The method according to claim 14, further comprising:

a querying step of querying said management apparatus for an available connection device that can provide a second transmission quality if there is no connection device that can acquire communications resources that provide a first transmission quality.

17. The method according to claim 14, wherein in said communications resources acquisition request step, a request is posted to a connecting device that can provide the second transmission quality if there is no connection device that can acquire communications resources that provide the first transmission quality.

* * * * *